(12) United States Patent
Schryver

(10) Patent No.: US 12,208,060 B2
(45) Date of Patent: Jan. 28, 2025

(54) SHAPING LIQUID MATERIAL IN A CRYOSTORAGE BAG TO OBTAIN DESIRED SOLID SHAPE

(71) Applicant: BioLife Solutions, Inc., Bothell, WA (US)

(72) Inventor: Brian Schryver, Redwood City, CA (US)

(73) Assignee: BioLife Solutions, Inc., Bothell, WA (US)

( * ) Notice: Subject to any disclaimer, the term of this patent is extended or adjusted under 35 U.S.C. 154(b) by 113 days.

(21) Appl. No.: 17/312,058

(22) PCT Filed: Oct. 2, 2019

(86) PCT No.: PCT/US2019/054346
§ 371 (c)(1),
(2) Date: Jun. 9, 2021

(87) PCT Pub. No.: WO2020/209892
PCT Pub. Date: Oct. 15, 2020

(65) Prior Publication Data
US 2022/0026130 A1    Jan. 27, 2022

(51) Int. Cl.
| | | |
|---|---|---|
| *A61J 1/10* | (2006.01) |
| *A01N 1/02* | (2006.01) |
| *A61J 1/16* | (2023.01) |
| *B65D 81/38* | (2006.01) |
| *F25C 1/22* | (2018.01) |
| *F25D 3/10* | (2006.01) |
| *F25D 25/00* | (2006.01) |

(52) U.S. Cl.
CPC .............. *A61J 1/10* (2013.01); *A01N 1/0284* (2013.01); *A61J 1/165* (2013.01); *B65D 81/3816* (2013.01); *F25C 1/22* (2013.01); *F25D 3/10* (2013.01); *F25D 25/00* (2013.01); *F25D 2303/084* (2013.01)

(58) Field of Classification Search
CPC ..... A61J 1/10; A61J 1/16; A61J 1/165; A01N 1/0284; A01N 1/0268; A01N 1/02; A01N 1/0257; F25D 3/10; F25D 25/00; F25D 2303/084; B65D 81/3816; F25C 1/22
See application file for complete search history.

(56) References Cited

U.S. PATENT DOCUMENTS

| | | | |
|---|---|---|---|
| 3,719,213 A | * | 3/1973 | Quick ...................... B65B 3/14 141/10 |
| 4,018,911 A | | 4/1977 | Lionetti et al. |
| 4,090,374 A | | 5/1978 | Faust et al. |

(Continued)

FOREIGN PATENT DOCUMENTS

| | | | |
|---|---|---|---|
| JP | H07012878 U | 3/1995 | |
| JP | H10507113 A | 7/1998 | |
| WO | WO-2013053011 A1 | * 4/2013 | ........... A01N 1/0236 |

OTHER PUBLICATIONS

International Search Report for PCT/US2019/027047 dated Jun. 26, 2019.

(Continued)

*Primary Examiner* — Nelson J Nieves
(74) *Attorney, Agent, or Firm* — Brown & Michaels, PC

(57) ABSTRACT

Systems, devices and methods for shaping a liquid material within a cryostorage bag while undergoing a freezing procedure.

20 Claims, 20 Drawing Sheets

(56) References Cited

U.S. PATENT DOCUMENTS

| | | | |
|---|---|---|---|
| 4,194,369 A * | 3/1980 | Faust | F25D 25/00 62/530 |
| 5,935,848 A | 8/1999 | Sputtek et al. | |
| 6,146,124 A * | 11/2000 | Coelho | B29C 66/543 425/388 |
| 6,213,334 B1 * | 4/2001 | Coelho | B29C 66/0242 222/416 |
| 6,808,675 B1 * | 10/2004 | Coelho | A61J 1/10 264/553 |
| 8,177,123 B2 * | 5/2012 | Voute | A01N 1/0263 206/505 |
| 8,821,471 B2 * | 9/2014 | Bianco | B65B 3/045 604/408 |
| 9,161,527 B2 * | 10/2015 | Cutting | A01N 1/02 |
| 9,441,875 B1 * | 9/2016 | Froehlich | F25D 25/00 |
| 9,523,072 B2 * | 12/2016 | Reinbigler | B29C 49/4815 |
| 9,649,253 B2 * | 5/2017 | Delorme | A61J 1/10 |
| 10,309,863 B2 * | 6/2019 | Sanchez | G01M 3/3218 |
| 10,918,572 B2 * | 2/2021 | Sanchez | A61J 1/10 |
| 2003/0098257 A1 | 5/2003 | Robertson | |
| 2003/0191005 A1 | 10/2003 | Coelho et al. | |
| 2007/0209960 A1 | 9/2007 | Leoncavallo et al. | |
| 2007/0240432 A1 | 10/2007 | Voute et al. | |
| 2010/0072216 A1 | 3/2010 | Voute et al. | |
| 2011/0229615 A1 | 9/2011 | Pedersen | |
| 2011/0309086 A1 | 12/2011 | Arnitz et al. | |
| 2012/0017609 A1 | 1/2012 | Voute et al. | |
| 2012/0152943 A1 | 6/2012 | Leoncavallo et al. | |
| 2013/0056480 A1 * | 3/2013 | Calhau | A61J 1/165 220/592.26 |
| 2015/0231033 A1 * | 8/2015 | Agren | B65D 25/108 206/568 |
| 2015/0305324 A1 | 10/2015 | Ilyin et al. | |
| 2016/0195218 A1 | 7/2016 | Cutting et al. | |
| 2016/0250262 A1 * | 9/2016 | Agulnick | A01N 1/0278 424/93.7 |
| 2016/0257411 A1 * | 9/2016 | Thiele | B64D 13/08 |
| 2018/0055986 A1 | 3/2018 | Brown et al. | |
| 2018/0128707 A1 * | 5/2018 | Sanchez | G01M 3/3272 |
| 2019/0125628 A1 * | 5/2019 | Sanchez | A61J 1/10 |
| 2020/0154699 A1 * | 5/2020 | Wergeland | A01N 1/0294 |
| 2021/0007932 A1 * | 1/2021 | Alford | A45C 11/24 |
| 2022/0031567 A1 * | 2/2022 | Sanchez | A61J 1/16 |
| 2022/0031568 A1 * | 2/2022 | Sanchez | A61J 1/10 |

OTHER PUBLICATIONS

International Search Report for PCT/USS2019/054346 dated Feb. 25, 2020.

* cited by examiner

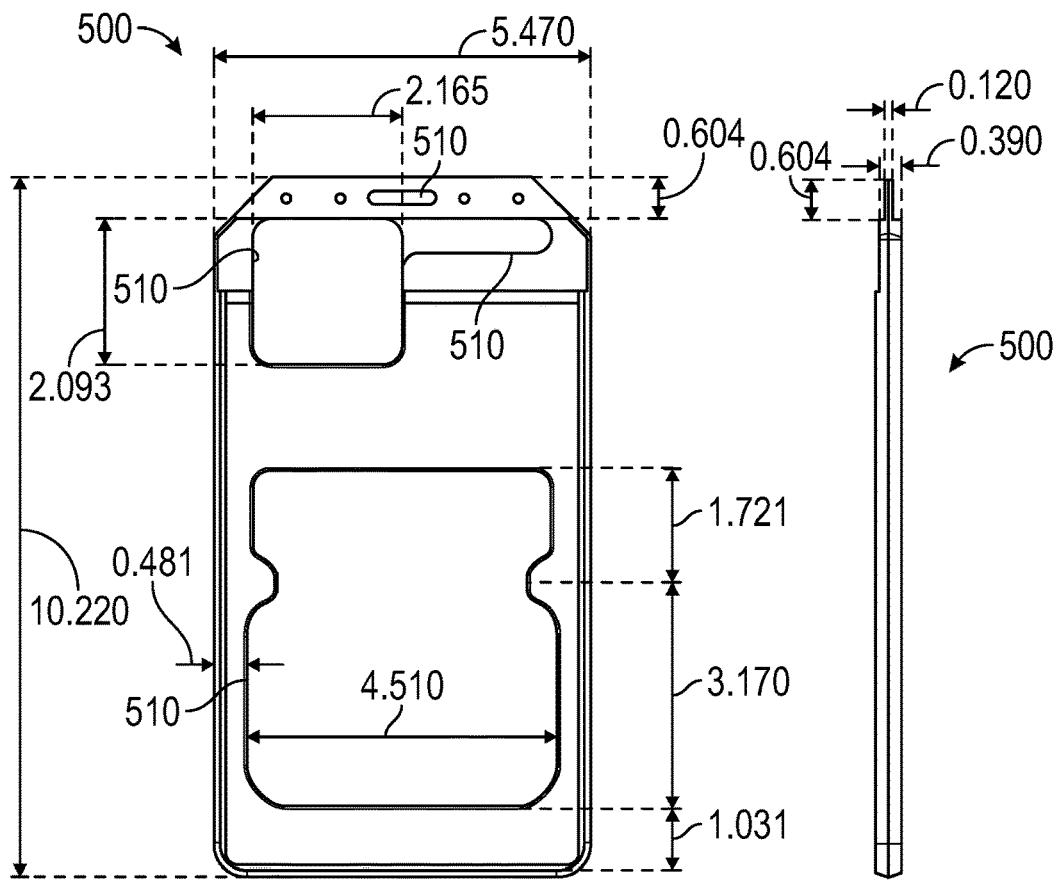
FIG. 5A  FIG. 5B
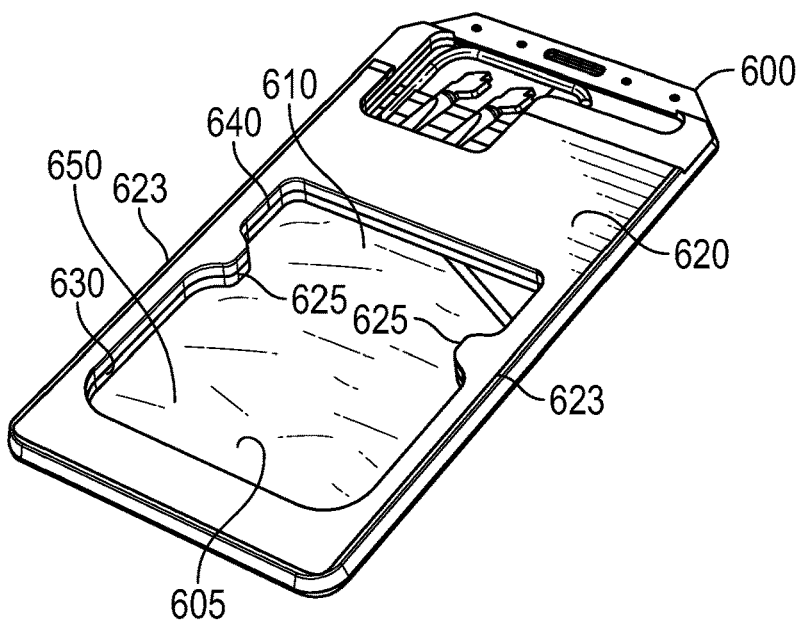
FIG. 6

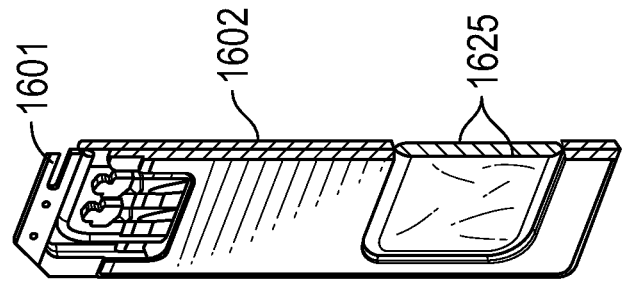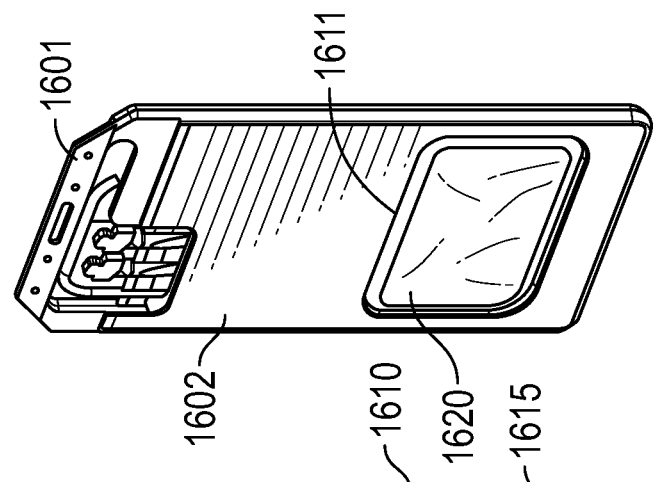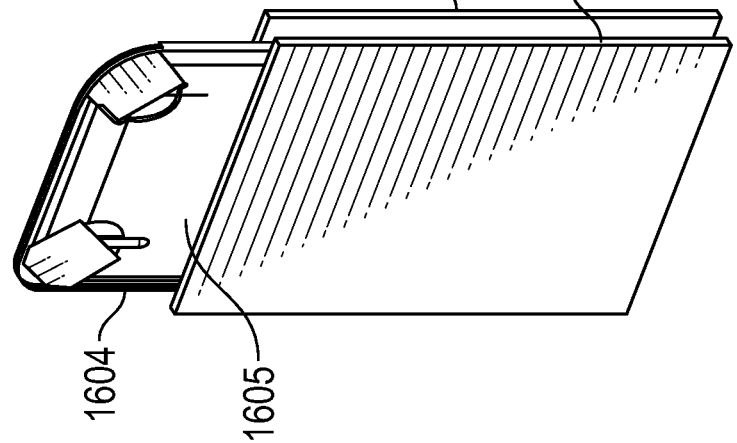

SHAPING LIQUID MATERIAL IN A CRYOSTORAGE BAG TO OBTAIN DESIRED SOLID SHAPE

RELATED APPLICATIONS

This application is a continuation-in-part of International application No. PCT/US2019/027047, filed Apr. 11, 2019, which claims priority to U.S. Provisional Patent application Ser. No. 62/655,895, filed Apr. 11, 2018, each of which is incorporated herein by reference, in their entirety.

FIELD OF THE INVENTION

The present invention relates to systems and method protecting cryostorage bags. In particular, the present invention relates to devices that provide protection from impact, shock, and acceleration damage to cryostorage bags during freezing, storage, transport, and thawing process. The present invention also pertains to devices that control the volumetric dimensions and surface geometry of a cryostorage bag upon solidification of the contents. In addition, the invention relates to devices that facilitate safe and secure handling of frozen cryostorage bags and for interfacing the cryostorage bag with freezing, storage, and thawing machinery and instruments.

BACKGROUND OF THE INVENTION

The long-term preservation of suspensions of cells by freezing and storage at cryogenic temperatures is a well-established technique. A wide variety of single cell types in addition to multicellular structures and organisms may be kept indefinitely through suspension in a cryopreservation fluid with subsequent freezing at a controlled rate of temperature reduction. The cryogenic storage vessels in which the cell suspensions are frozen are typically stored for extended periods in a vacuum-insulated tank that is refrigerated by liquid nitrogen, although mechanical refrigeration systems may be also applied for this purpose. Cell suspensions that are preserved by such methods may also be transported to remote locations while maintaining cryogenic temperature conditions of −196 to −150° C. by means of vacuum-insulated flasks wherein liquid nitrogen, as a refrigerant to maintain temperature, has been introduced into an absorbent material. Such a container is often referred to as a "dry-shipper". Alternatively, if short-term temperature shifts to a range of −80° C. to −50° C. are not exceedingly deleterious to cell viability, an insulated container using dry-ice as a refrigerant may be applied. Upon arrival at the destination, the frozen cell suspension may be transferred to a local extended-term storage system, or may alternatively be recovered from the refrigerated shipping system and used directly. Prior to use, frozen cell suspensions must be thawed and retrieved from the storage vessel. The handling processes, holding conditions, and documentation that encompass the cryopreservation system inclusive of freezing, local transport, local storage, shipping, remote reception, remote storage, remote transport, and thawing is often referred to as the "cold chain of custody".

Thawed cell suspensions may be treated to a variety of post-thaw processes, some examples of which may include testing and assessment, concentration, fluid exchange, culture expansion of the cell population, cell sorting, and cell engineering. Alternatively, for some cellular therapeutics, the thawed cellular suspension may be administered directly to a recipient. With recent and continuing advances in the cellular therapeutic field, the pharmaceutical industry has an acute interest in every detail of the cold chain of custody. A failure at any stage of the process may degrade the effectiveness of the therapeutic or even render the product unusable. As cellular therapeutics are associated with relatively high product costs, and may even represent the singular hope of survival for the recipient, maintaining the integrity of the product during the cold chain of custody is a critical consideration. As such, the reliability of the frozen suspension storage vessel is an essential property.

A common type of cryogenic storage vessel is a flexible-wall storage bag, also referred to as a "freezing bag", a "cryopreservation storage bag", or a "cryostorage bag". A non-limiting representation of a commercially available (PRIOR ART) cryostorage bag 100 is shown in FIG. 1. The cryostorage bag 100 comprises two laminations of a flexible polymer material, each layer of which may itself be a laminar structure comprising different polymeric materials. The cryostorage bag 100 comprise two lateral edges 101, 103, a bottom edge 102, and a top edge 104. The two laminated layers are joined at a fusion seam 105 that forms a contiguous closed path around all edges except where interrupted by access port structures 106 and filler tubing 130, thereby forming a chamber 110 into which a fluid may be introduced through the filler tube 130 and thereby be contained. A secondary sealed region at the bottom of the bag 115 is often provided to allow placement of a through-slot 125 that is provided for the purpose of suspending the bag from a hanger apparatus. Some versions of the bag may comprise a region 120 adjacent to a length of one edge 126 that is not sealed such that card material with data or identification may be inserted and stored in the recess pocket there formed. As commercially provided, the filler tube is contiguous with a complex and often branched system of tubing (not shown) with each branch terminating in one of a variety of couplers or port seals. In common use, following the filling of the bag chamber or pouch 110, the tubing 130 is heat sealed (seal not shown) leaving an unspecified length as an extension. Frequently, if present, the extension may be occupied by a portion of the fluid contents of the bag, and heat sealed at intervals (not shown) leaving sample volumes that may be isolated by severance and used for a variety of purposes, including laboratory testing. In some instances, an exterior surface of a cryostorage bag comprises identifying information, such as printed or embossed alphanumerical characters. In some instances, an exterior surface of a cryostorage bag comprises a molded pocket configured to retain an information card.

Common procedures for cryostorage bag usage include the filling of the bag to a selected volume, after which, the tubing extension is often heat sealed at a location near to the ports and the remainder of the tubing assembly is severed and disposed. In some cases, a user will leave a short extension of tubing attached to the port area with intermittent seals such that, post thawing, segments of cell solution may be isolated for various testing purposes. The edge of the bag opposite to the port edge may comprise an extension of the sealed region in which may be located a slot by which the bag may be suspended on a hanging apparatus. This edge of the cryostorage bag may be referred to as the "bottom edge", and the remaining two sides of the cryostorage bag may be referred to as the "lateral edges". An orientation where the four edges of the bag are coplanar and the bag surface plane is perpendicular to the gravitational field vector may be referred to as a "flat orientation". When the bag surface is parallel to the gravitational field vector with the port edge at the top, the orientation may be referred as an "upright orientation", and where the edge with the extension and hanging slot is at the top, the orientation may be referred to as an "inverted orientation".

For some procedures, a cryostorage bag is enclosed within a storage or shipping cassette as part of a freezing process. Referring now to FIG. 2, a non-limiting representation of a commercially available (PRIOR ART) cassette 200 is shown. Cassette 200 is comprised of aluminum sheet metal and configured for the encasement and protection of a cryostorage bag 230 contained therein. The aluminum sheet cassette typically comprises a cover 210 that is joined by two through-pins or rivets 215 along the sides 205 that connect the lid to a case. Upon closure of the lid 210, a U-channel clasp 220 is rotated on a rivet hinge 225 to capture the case and lid, thereby securing the enclosure of the storage bag in the cassette interior. It should be noted that the representative bag 230 and the cassette are drawn to scale for the given bag size (a nominal volume 500 ml cryostorage bag). As such the empty interior margins 235 indicated are also drawn to scale, and illustrate how inertial shifting of the bag within the cassette through the application of forces external to the cassette may occur under normal usage, and that if the force were to be sufficiently substantial that a collision between the interior wall of the cassette and the bag edges would be a likely outcome. As containment of cryostorage bags in an aluminum cassette of the type shown prior to freezing of the bag and contents, as well as during transport, storage, and shipment is a nearly universal practice, it is understandable that at some time during the aggregate sum of these cold chain stages, that one or a multiple of collision incidents between the cryostorage bag edge and the interior wall of the cassette will take place, with each incident risking damage to the cryostorage bag. As the cryostorage bag material will become inflexible and brittle at cryogentic temperatures, any shift or movement of the bag relative to the cassette that subjects the tubing extension to impact while in a rigid frozen state, will place a rotational torque on the junction of the tubing and the cryobag seam, often resulting in fractures around the joint.

As a result of the flexible properties and fragile design of cryostorage bags, various procedures are generally followed and limits applied when preparing and freezing these types of cryostorage vessels. For example, to control the thickness of the cryostorage bag vessel, the bags are typically limited in fill volume, and frozen in an orientation such that the major planar surfaces of the bag are perpendicular to the gravitational force vector (also referred to as a "flat" orientation). In some instances, the filled bags may be frozen while being stored within a rigid cassette in order to limit and control the thickness of the frozen cryostorage bag and contents. However, despite efforts taken during the freezing process, the natural expansion of the aqueous solution in the flexible cryostorage bag results in uneven surface variations, dimensions, and solution thicknesses, which may be undesirable, and which may indirectly affect the viability of the frozen sample upon thawing.

Cellular or sample damage may further occur due to temperature fluctuations as a result of user contact when handling, transferring, and/or opening shipping cassettes to confirm the identity of the contents. This is particularly true when the cassettes comprise a thermoconductive material, such as aluminum. Additionally, some cassette materials act as a Farady cage which impedes remote scanning of various technologies, such as RFID tags contained within the cassette.

Accordingly, although various methods and devices currently exist for preparing, transporting and storing sensitive frozen materials, challenges still exist. The device and methods of the present invention address and meet these needs.

SUMMARY OF THE INVENTION

The present invention relates to devices that provide protection from impact, shock, and acceleration damage to cryostorage bags during freezing, storage, transport, and thawing process. The present invention also pertains to devices that control the volumetric dimensions and surface geometry of a cryostorage bag upon solidification of the contents. In addition, the invention relates to devices that facilitate safe and secure handling of frozen cryostorage bags and for interfacing the cryostorage bag with freezing, storage, and thawing machinery and instruments.

In a first aspect, the present invention is directed to a low-cost and disposable protective cassette or shell for a cryostorage bag, wherein the protective shell can be recycled through common plastics recycling systems, is not opaque to radio or visible electromagnetic wavelengths, and also comprises a protective interface cushion device interposed between the cryostorage bag and the protective shell to reduce or eliminate damage due to collisions between the cryostorage bag and the protective shell, and that also reduces the skin freezing hazard upon unprotected contact with the protective shell. In some instances, the material of the protective shell further provides increased grip security in handling of frozen cryostorage bags, and correctly positions the cryostorage bags within freezing instruments, storage systems, transport systems, and thawing instruments.

In a second aspect, the system and methods described herein prepare frozen samples in a configuration that greatly facilitates the interaction of the cryostorage bag and contents with freezing, storage, transport, and thawing equipment that are specifically designed to take advantage of a preferred configuration, thereby enhancing one or more performance parameters of the processes associated with the equipment.

In a third aspect, a freezing and storage system apparatus is provided comprising a protective interface cushion device for enveloping commonly available cryostorage bag vessels in a device that will configure and adapt the cryostorage bags to one or more desired devices configured to optimize the processes of filling, freezing, storage, transport, tracking and/and thawing of the cryostorage bag and its contents. Some aspects of the system and methods pertain to the encasement, attachment and positioning of a protective interface cushion device to commercially available cryostorage bags or custom-designed cryostorage bags so as to interpose energy-absorbing and force distributing material between the cryostorage bags and surrounding rigid protective shell.

In a fourth aspect, the present invention provides one or more methods and apparatuses for controlling at least one of: i) the location, ii) the geometric shape, and iii) the boundaries of liquids and solids contained within a cryostorage bag. In some instances, this control is achieved through the attachment and positioning of a protective interface cushion device to a commercially available or custom-designed cryostorage bag. In some instances, system and methods for positioning and selective containment of liquid within cryostorage bags is achieved during the solidification process such that the resulting solid mass will attain selected geometric shapes and positions within the cryostorage bag. In some instances, the molded shapes resulting from the application of the system and methods of the invention allows the shapes to contribute to a reduction in the damage potential of kinetic impact, shock or acceleration to the cryostorage bag. In some instances, the solid molded shapes resulting from the application of the system and methods of the invention allows thawing equipment to be constructed that utilizes the pre-positioned and geometrically configured shapes to optimize the ease of use, thawing rate, phase separation, and temperature control aspects of the thawing process. In other aspects of the invention, a protective interface cushion device is provided having properties and structures that enhance the secure and safe handling of the protective interface cushion device and cryostorage bag assembly at cryogenic temperatures. Furthermore, in some instances, a protective interface cushion device is provided that comprise one or more features to allow or optimize interaction with machinery such as, for example, assembly equipment, bag filling equipment, freezing instruments, robotic archival equipment, and thawing instruments. In some instances, a protective interface cushion device comprises one or more seams pre-configured to facilitate intentional separation thereby allowing easy insertion and removal of the cryostorage bag from the protective interface cushion device.

In a fifth aspect, a protective shell is provided that may encase and directly engage selected surfaces of the previously described protective interface cushion device and cryostorage bag assembly. In some instances, a protective shell is provided comprising two or more assembly components configured to allow the protective shell to be reversibly assembled and disassembled over a temperature range from cryogenic temperatures to ambient temperatures. In some instances, the various pieces of the protective shell engage one another and are secured by features that require transient distortion of the parts in order to achieve a fastened or unfastened configuration. In some instances, independent latching parts of the protective shell are configured to overcome the resistance of the various engaged pieces of the rigid shell to assist fastening and unfastening the shell parts during use.

In a sixth aspect, a protective shell is provided comprising cutout areas and paths which create a flap access to the interior of the protective shell at selected locations, in addition to design elements that serve to secure the flap access. Some variations of the protective shell comprise various extensions, shaped flange features, and/or additional accessories that provide attachment or gripping points for interaction with specific machinery, for example, assembly equipment, freezing instruments, thawing instruments, robotic storage mechanisms, shipping containers, robotic transport or sorting machinery, and manual tools.

In a seventh aspect, the present invention includes methods for the use of a protective interface cushion device and, alternatively a protective shell, to selectively configure the location of the contents of the cryostorage bag within the protective interface cushion device and within the cryostorage bag assembly prior to and after a freezing process. Some aspects of the methodology apply to the formation of specific geometric shapes of the contents of the cryostorage bag in the aforementioned assembly upon solidification of the liquid contents during the freezing process, in addition to a description of preferred freezing equipment for achieving described shape geometries. Likewise, some aspects of the methodology pertain to the use of one or more achieved frozen shapes with thawing instruments and thawing equipment elements configured to take advantage of one or more performance parameters made available by the present invention, including, but not limited to, enhanced rate of thaw, prevention of over-heating of liquefied contents during and following the thawing process, dynamic and automatic separation of liquid and solid phases during the thawing process, and increased ease of use of a thawing instrument when the methodology, systems and apparatuses of the present invention are applied.

In some instances, a system for shaping a liquid material within a cryostorage bag while undergoing a freezing procedure is provided, wherein said system comprises: a cryostorage bag having a sealed perimeter defining an interior region configured to receive a liquid material, said interior region having an inner perimeter shape; a pair of cushion elements having an outer perimeter and comprising a cut-out shape that is approximately the same shape as the inner perimeter shape of the interior region, said pair of cushion elements being configured to sandwich the cryostorage bag between the pair of cushion elements; a pair of frame elements having an outer perimeter that is approximately the same as the outer perimeter of the pair of cushion elements, and comprising a window having a desired shape, wherein the position of the window approximately corresponds to the interior region of the cryostorage bag when the cryostorage bag and the pair of cushion elements are sandwiched between the pair of frame elements, wherein the cryostorage bag, the pair of cushion elements and the pair of frame elements provide a vessel assembly when the cryostorage bag and the pair of cushion elements are sandwiched between the pair of frame elements; a pair of spacers having an outer perimeter that is approximately the same as the desired shape of the window such that the pair of spacers may be seated within the window of the pair of frame elements with minimal tolerance; and a pair of thermally conductive plates having an outer perimeter that is approximately the same as the outer perimeter of the pair of cushion elements, and comprising a planar inner surface, wherein pair of thermally conductive plates are configured to sandwich the vessel assembly and pair of spacers together during a freezing procedure.

In some instance, the pair of cushion elements are flexible at a cryogenic temperature. In some instances, the pair of spacers are flexible at a cryogenic temperature. In some instances, the pair of cushion elements comprises a thermoinsulative material. In some instances, the pair of spacers comprise a thermoinsulative material. In some instances, the pair of frame elements are rigid.

In some aspects of the invention, a desired shape is a rectangle. In some instances, a desired shape determines a length and a width of a solid shape of the liquid material following a freezing procedure. In some instances, when the vessel assembly and the pair of spacers are sandwiched between the thermally conductive plates, a distance between the planar inner surfaces of the thermally conductive plates determines a height of the solid shape. In some instances, the cryostorage bag, the pair of cushion elements, and the pair of frame elements are secured together with a fastener to provide a vessel assembly. In some instances, a sealed perimeter of the cryostorage bag comprises a plurality of indents or other features (such as holes) configured to permit passage of the fastener. In some embodiments, the fastener comprises a plurality of rivets and guide holes, wherein the rivets may comprise plastic and are secured within the guide holes by thermal deformation.

In some aspects of the invention, a clamping structure is provided and configured to press the thermally conductive plates inwardly against the pair of spacers and the vessel assembly sandwiched therebetween.

In some instances, the cryostorage bag further comprises an access channel extending outwardly from the interior region and in fluid communication thereto, wherein the access channel comprises a length that extends outwardly beyond the outer perimeter of the pair of cushion elements when the vessel assembly is assembled.

Some embodiments of the present invention further comprise a method for shaping a liquid material within a cryostorage bag while undergoing a freezing procedure, said method comprising steps tier: positioning a cryostorage bag between a pair of cushion elements; positioning the cryostorage bag and the pair of cushion elements between a pair of frame elements; securing the cryostorage bag, the pair of cushion elements, and the pair of frame elements together to provide a vessel assembly; accessing and filling an interior region of the cryostorage bag of the vessel assembly with a liquid material; sealing the liquid material within the interior region of the cryostorage bag of the vessel assembly; trimming an excess portion of the cryostorage bag; fitting spacers within a window of the pair of frame elements and in contact with the cryostorage bag; restricting the liquid material to a region of the cryostorage bag as defined by the pair of cushion elements, the pair of frame elements, and the spacers; sandwiching the vessel assembly and the spacers within the window of the pair of frame elements between two opposing thermally conductive plates; and freezing the liquid material to provide a solid shape, wherein the solid shape is defined by pair of cushion elements, the pair of frame elements, the spacers, and the thermally conductive plates. In some instances, a method of the present invention further comprises a step for applying a clamping pressure to an outer surface of the thermally conductive plates such that a compressive force is exerted on the vessel assembly, the spacers, the cryostorage bag, and the restricted liquid material within the region of the cryostorage bag during a freezing procedure. In some aspects, the solid shape comprises two opposing major planar and parallel surfaces. In some embodiments, a method of the present invention comprising a step for securing the cryostorage bag, the pair of cushion elements, and the pair of frame elements together with a fastener prior to the step of accessing and filling the interior region of the cryostorage bag.

These and other aspects, embodiments, and advantages of the invention are described in the attached drawings and following detailed description.

BRIEF DESCRIPTION OF THE DRAWINGS

FIG. 5A shows a dimensioned drawing of a front view of a protective interface cushion device in accordance with a representative embodiment of the present invention.

FIG. 5B shows a dimensioned drawing of a side view of a protective interface cushion device in accordance with a representative embodiment of the present invention.

FIG. 6 shows a perspective view of an empty cryostorage bag assembled within a protective interface cushion device in accordance with a representative embodiment of the present invention.

FIG. 16A shows a perspective view of a cryostorage bag within a protective interface cushion device in use with external freezing instrument components in accordance with a representative embodiment of the present invention.

FIG. 16B shows a perspective view of a cryostorage bag within a protective interface cushion device following a freezing process with external freezing instrument components in accordance with a representative embodiment of the present invention.

FIG. 16C is a cross-section view of cryostorage bag within the protective interface cushion of FIG. 16B.

DETAILED DESCRIPTION OF THE INVENTION

Figure 1:
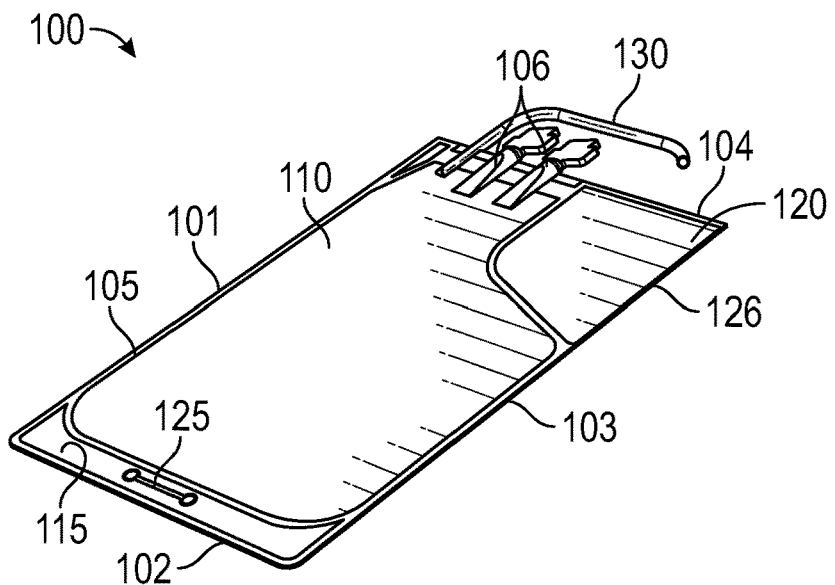
FIG. 1 is a perspective view of a PRIOR ART cryostorage bag device.

The present invention provides a storage system for a cryostorage bag having features configured to optimize uniform and consistent freezing and thawing procedures, as well as provide protection to the cryostorage bag and its contents during transportation and storage. The storage system is configured to work with commercially available cryostorage bags, and may be adapted for compatibility with any existing or future conceived cryostorage bags.

In some embodiments, a storage system for a cryostorage bag is provided having a protective interface cushion device, a protective interface cushion, a cushion device, or a cushioning device comprising an upper half and a lower half configured to receive a cryostorage bag in a sandwiched or laminated configuration, wherein the cryostorage bag is interposed between the upper and lower halves of the cushion device. In some embodiments, upper and lower halves are separate pieces. In some embodiments, upper and lower halves are hingedly attached, such as along a lateral side or a top or bottom edge of the upper and lower halves. In some embodiments, upper and lower halves are attached at two or more edge surfaces to form an envelope or bi-layer sleeve configured to receive a cryostorage bag.

In some embodiments, the upper and/or lower halves comprise one or more cutouts and/or one or more recesses formed on an interior surface of the halves, wherein these features are provided and act as a mold to achieve a desired shape or configuration of a solution in the cryostorage bag during and following a freezing process. The upper and/or lower halves may further comprise one or more openings to provide access to the bag ports or bag port extension tubing, or to prevent interference of the protective interface cushion with ports or port extension tubing of the cryostorage bag.

In some embodiments, the upper and lower halves are further divided into two or more lamination layers. In other embodiments an additional layer of material is inserted between the upper and lower halves, specifically along the edges of at least one of the upper and lower halves. The layers of protective interface cushioning material may be joined along any path by a single joining method or combination of methods. In some embodiments the layers are joined in close proximity to and along the edges of the protective interface cushioning device exclusively, while in other embodiments the layers are joined along paths that are more offset from the edges, joined in paths that are perpendicular to the edges, or joined in paths that include curvature. In some embodiments, a joint may bind all cushion layers, while in some embodiments a joint may bind only subsets of laminations. In some embodiments, the protective cushion laminations may be joined by means of stitching, adhesive bonding, heat fusion welding, ultrasonic fusion welding, radio frequency fusion welding, or by capture between solid strips, frameworks, or staples. In some embodiments, solid bodies or solid material that capture some or all lamination layers may form reinforced or more rigid regions for holding, hanging or interfacing the cushioning device with external accessories, machines or instruments. In some embodiments, these solid bodies or solid materials provide one or more capturing bodies that surround one or more through-holes or other features that form openings in the laminated layers.

Generally, portions of the cryostorage bag expand into the one or more cutouts and/or one or more recesses as the liquid contents of the cryostorage bag solidify during a freezing process. Upon subsequent removal of the protective interface cushion device, the resultant and desired shape or configuration of the cryostorage bag and its contents may assist in storing the cryostorage bag. In some instances, the resultant and desired shape or configuration of the cryostorage bag and its contents is utilized to process the contents of the cryostorage bag, such as to provide optimized interaction with external thawing instrument equipment and/or components.

Following the freezing process, the one or more cutouts and/or one or more recesses of the upper and lower halves of the protective interface cushion device provide cushioning to the frozen contents and protect fragile elements of the cryostorage bag, such as the heat-sealed seams, as well as prevent undesirable movement or shifting of the cryostorage bag relative to the protective interface cushion device and other elements of the storage system. In some embodiments, the protective interface cushion device comprises a thermo-insulative material configured to absorb impact, shock, and acceleration forces at cryogenic temperatures.

In some embodiments, the storage system further comprises a protective shell cassette comprising a first half and a second half, each half having an interior surface for receiving and housing at least a portion of the protective interface cushion device and cryostorage bag stored therein. In some embodiments, the interior surface is configured to precisely receive and securely hold a position of the protective interface cushion therein, such that the protective interface surface is prevented from moving or shifting within the protective shell cassette when the two halves of the cassette are joined in a closed configuration. In some embodiments, one or more portions of the interior surface of the protective shell cassette comprise a shape or other feature provided as a mold to achieve a desired shape or configuration of the solution in the cryostorage bag during and following a freezing process. In some embodiments, the interior surface of the protective shell cassette is planar, such that any portions of the cryostorage bag that contact the planar interior surface during the freezing process are made flat. In some embodiments, a portion of the interior surface is recessed. In some embodiments, a portion of the interior surface is protruded.

In some embodiments, the cryostorage bag storage system consists only of the protective interface cushion device. In some embodiments, the cryostorage bag storage system comprises a protective interface cushion device used in combination with a protective shell configured for direct contact with selected surfaces of the protective interface cushion device, and completely or partially surrounds the protective interface cushion device and a cryostorage bag positioned within the protective interface cushion device. In some embodiments, the protective shell further comprises one or more surfaces configured to contact one or more portions of a cryostorage bag positioned within the protective interface cushion device during a freezing process. In some embodiments, the protective interface cushion device is intended to be used without the protective shell, for example, when interfacing with freezing instruments, or when interfacing thawing instruments. In other embodiments, the protective interface cushion device is intended to be contained within and used with the protective shell, for example during freezing, storage, or transport of a cryostorage bag disposed therein.

In some embodiments, the protective shell comprises a rigid material that is dimensionally stable at cryogenic temperatures. In some embodiments, the protective shell comprises a rigid material that is resistant to swelling or lateral expansion due to increased internal pressure from the contents of the cryostorage bag during a freezing process. In some embodiments, the protective shell comprises a radiotransparent material. In some embodiments, the protective shell comprises a visually-transparent material. In some embodiments, the protective shell comprises a thermoinsulative material. In some embodiment, the protective shell comprise a thermoconductive material.

Figure 2:
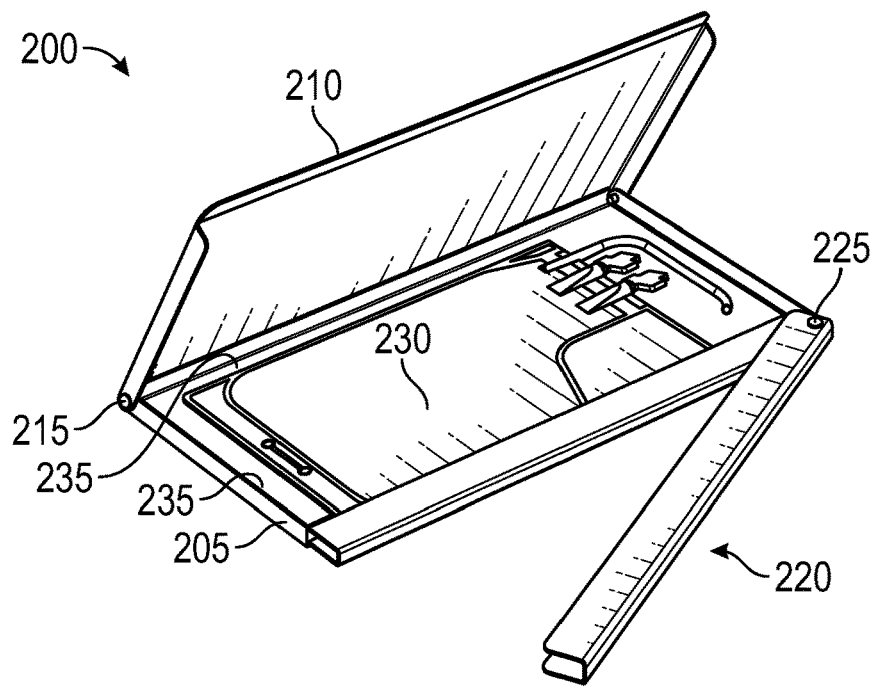
FIG. 2 is a perspective view of a PRIOR ART cryostorage bag device stored within a PRIOR ART rigid storage or shipping cassette in an opened configuration.

In the following discussion, orientation references will be described relative to the features present on various PRIOR ART cryostorage bags that are commercially available, such as is shown and discussed in connection with FIGS. 1 and 2, above.

Some of the features of the invention are generally described in FIGS. 3-17 which are provided for the purpose of illustrating the practice of the invention and which do not constitute limitations of the scope thereof.

Figure 3:
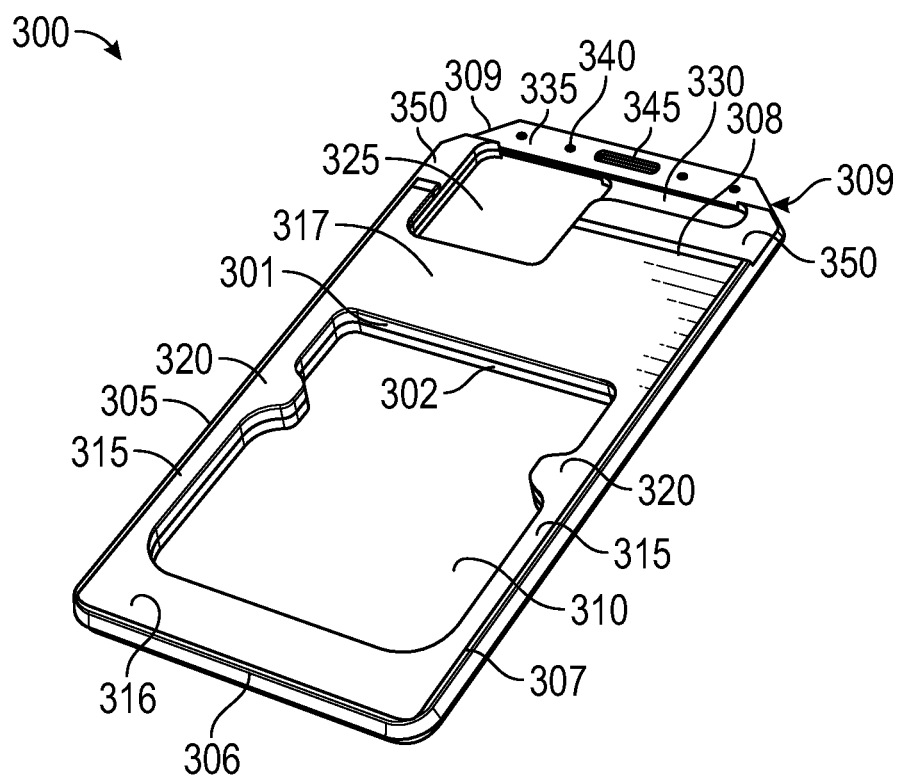
FIG. 3 is a perspective top view of a protective interface cushion device in accordance with a representative embodiment of the present invention.

Referring now to FIG. 3, a protective interface cushion device 300 is shown. In some embodiments, protective interface cushion device 300 comprises an upper half 301 and a lower half 302. Upper and lower halves 301 and 302 may comprise any number of layers. For example, in some embodiments upper and lower halves 301 and 302 each comprise a single layer. In other embodiments, at least one of upper and lower halves 301 and 302 comprise two or more layers.

In some embodiments, an outline border of the upper and lower halves is a nominally rectangular shape and, in some embodiments, one or more corners or halves are trimmed in a mitered edge 309.

In some embodiments, upper and lower halves 301 and 302 are joined in a seam along one or more edges. For example, in some embodiments upper and lower halves are joined along at least one of lateral edges 305 and 307. In some embodiments, upper and lower halves are joined along the bottom edge 306. In some embodiments, upper and lower halves are joined along at least a portion of the top edge 308. In some embodiments, upper and lower halves are joined along at least a portion of lateral edges 305 and 307, at least a portion of bottom edge 306 or at least a portion of top edge 308. In some instances, edge surfaces are joined at a location that is offset by some distance from the absolute edges of the halves. The offset distance for each individual edge may be different for each edge and may change along an edge.

In some embodiments, at least one of upper and lower halves 301 and 302 further comprise a cutout space. In some embodiments, cutout spaces 310, 325, 345, 340 that extend through both halves are provided. In some embodiments, regions 350, 330 may be removed from only one half, a partial depth of one half, a partial depth of both halves, or a combination thereof. In some embodiments, a partial or complete cutout space (i.e., a removed region) provide a frame (i.e. 310) defined by a margin of remnant material 315, 316, 317, wherein a distance between a boundary of the removed region and a seam of the protective interface cushion device 300 is not less than 1 mm, as measured normal to a perimeter edge of the protective interface cushion device 300. In some embodiments, remnant material surfaces 316, 317 of protective interface cushion device 300 are contiguous between opposing perimeter edges, such as lateral seams 305, 307. In some embodiments, one or more projections 320 are provided which extend from a boundary frame margin 315 and into a cutout region providing a frame 310.

In some embodiments, protective interface cushion device 300 comprises an upper region 335, wherein upper region 335 may comprise a full thickness, or a thinned thickness, as shown. In this upper region 335, the layers of the halves may be independent, joined by one or more seams, or joined over the entire region by one or by several joining methods, which may include heat fusion. In some embodiments, seams 305, 306, 307, and 308 are joined by at least one of a stitching process, a heat seal, an ultrasonic weld, a radio-frequency weld, an adhesive bond, staples, or any combination thereof. In some embodiments, a through-slot 345 is provided in the upper region 335. In some embodiments, through-holes 340 are provided in upper region 335.

Protective interface cushion device 300 may comprise any material or combination of materials configured to absorb impact, shock and acceleration forces at cryogenic temperatures. As most materials that are flexible at ambient temperatures become stiffer at cryogenic temperatures, selecting a cushion material that remains flexible and compressible at cryogenic temperatures may be beneficial for the application. In some embodiments, protective interface cushion device 300 comprises a thermoinsulative material that remains flexible or deformable over a range of temperatures from ambient to cryogenic temperatures. In some embodiments, the protective interface cushion device may comprise a fibrous synthetic polymer material, as at cryogenic temperatures, polymeric fibers may remain sufficiently flexible to sustain a compressible cushioning effect. In addition, a synthetic polymer fiber mat or felt material may be applied that is uniform in density and structure such that hard inclusions may be reliably absent from the material stock. Further, a fibrous thermoplastic felt material may be joined or bonded by a variety of methods including stitch bonding or thermal fusion. In some embodiments the protective interface cushion device may be constructed from a polypropylene felt material. Felt materials constructed from polypropylene fibers are available commercially in a range of densities, compressibility, stiffness and thicknesses. In other embodiments, the protective interface cushion device may comprise a fiber mat or felt constructed from a polymer other than polypropylene. Using polymer mat or felt material, cushion structures may be cheaply constructed by die-cutting or CNC machine cutting sheet material and subsequently joining laminations of the appropriate shapes to form the cushion structure. In other embodiments, the protective interface cushion device may be constructed from an alternative material structure such as a foam material. In some embodiments the protective interface cushion device comprises a polypropylene foam, a polyethylene foam or a blended polymer foam.

Figure 4A:
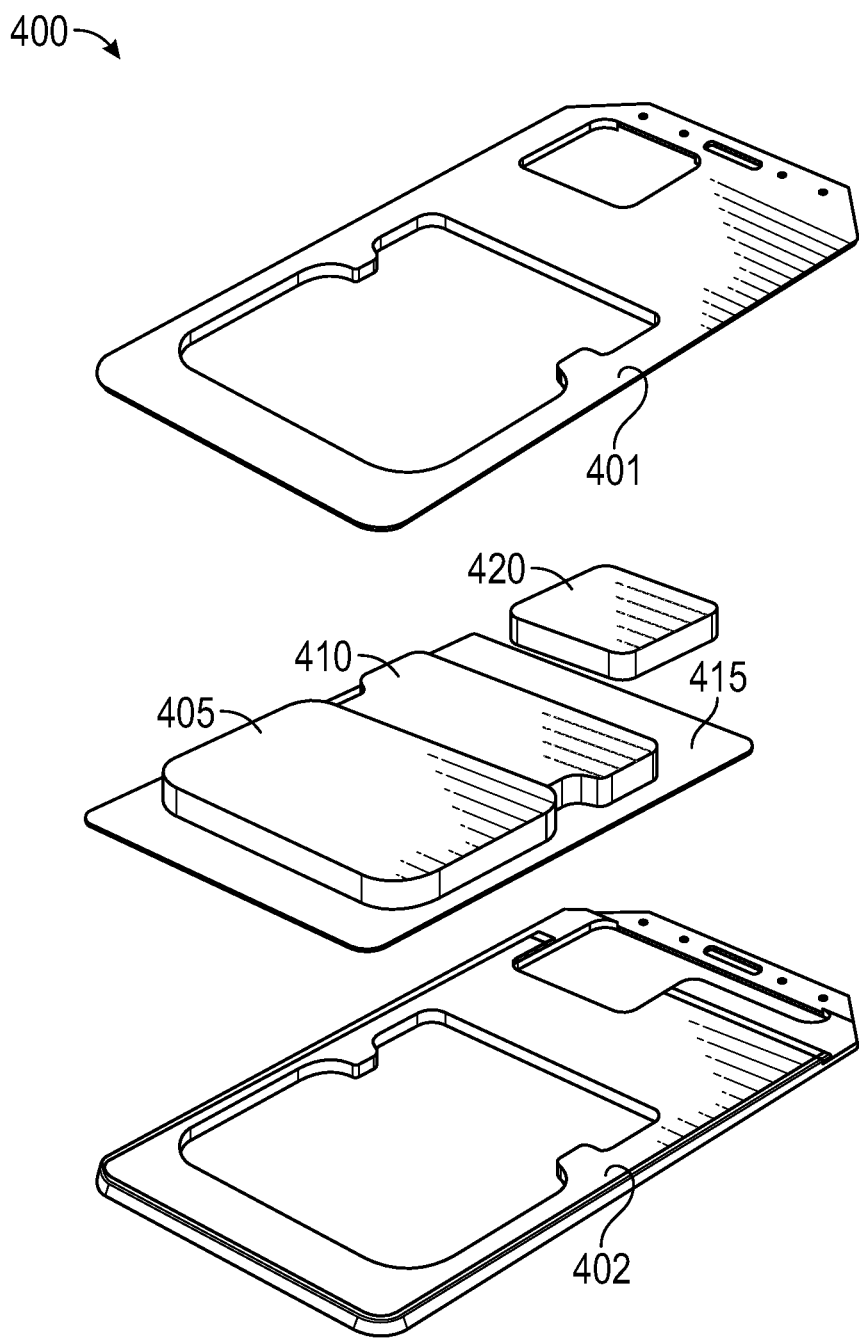
FIG. 4A shows an exploded perspective view of a protective interface cushion device and a region map of a cryostorage bag following a freezing process in accordance with a representative embodiment of the present invention.
Figure 4B:
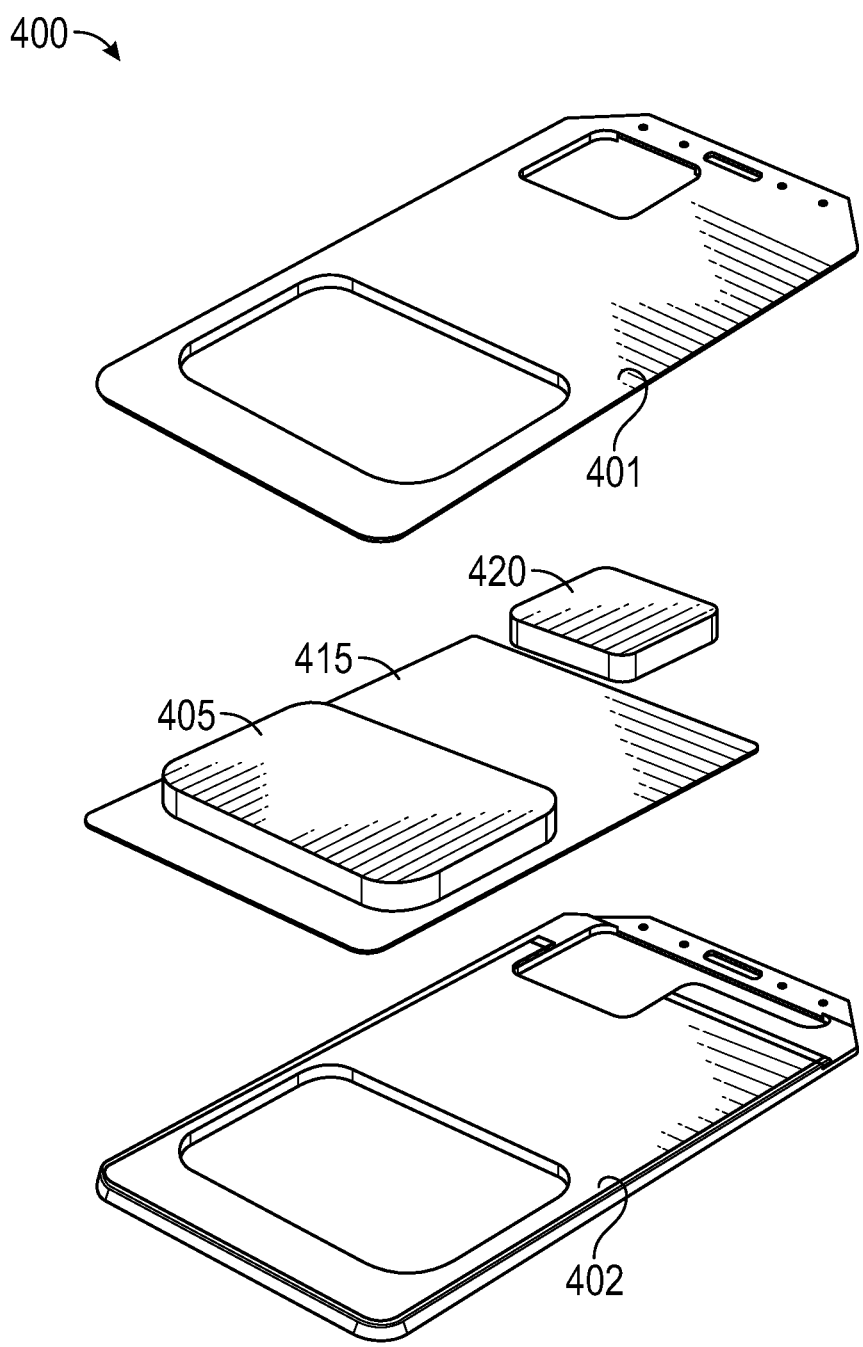
FIG. 4B shows an exploded perspective view of a protective interface cushion device and a region map of a cryostorage bag following a freezing process in accordance with a representative embodiment of the present invention.

Referring now to FIGS. 4A and 4B, representative embodiments of upper 401 and lower 402 halves of protective interface cushion device 400 are shown in relation to various potential regions of a cryostorage bag. In some embodiments, a volumetric region 405 of cryostorage bag is referred to as the "fill volume", a volumetric region 410 is referred to as the "overflow volume", an empty or minimally filled region 415 is referred to as the "exclusion area", and a volumetric region 420 is referred to as the "port relief area".

In some embodiments, upper and lower halves 401 and 402 of protective interface cushion device 400 comprise a plurality of cutouts to accommodate or provide one or more desired regions for a cryostorage bag during a freezing process. For example, in some embodiments protective interface cushion device 400 comprises a cutout to accommodate a port relief area 420 of a cryostorage bag, wherein a region of the protective interface cushion device 400 corresponding to this area is of a cryostorage bag is entirely cutout so that there will be no interference with the port assembly. Generally, regions 405, 410, 415 and 420 of a cryostorage bag correspond directly to features of upper and lower halves 401 and 402 of protective interface cushion device 400, and may include, for example, various cutouts, frame remnants, and projections. Regions 405, 410, and 415 collectively correspond to a containment area of a cryostorage bag when sandwiched and held between upper and lower halves 401 and 402 of protective interface cushion device 400. In some embodiments, a containment area of a cryostorage bag comprises an exclusion area 415, which corresponds to an area or portion of cryostorage bag that is positioned between two corresponding opposing surfaces of upper and lower halves 401 and 402, wherein the two opposing surfaces apply a compression force on exclusion area 415 thereby causing reduced presence of liquid contents in this area.

In some embodiments, one or more corresponding surfaces, cutouts, frames or other features of upper and/or lower halves 401 and 402 are provided to achieve a preferred fill volume for a cryostorage bag. For example, in some embodiments protective interface cushion device 400 is configured such that a fill volume 405 is fully occupied by liquid contents of the cryostorage bag. In some embodiments, protective interface cushion device 400 is configured such that a fill volume 405 is partially filled, or partially occupied by liquid contents. In some embodiments, protective interface cushion device 400 is configured such that an overflow volume 410 is partially filled, or partially occupied by liquid contents when a portion of a fluid contained within fill volume 405 is displaced from fill volume 405, such as due to a volume limiting parameters or dimension of upper or lower halves 401 and 402 of protective interface cushion device 400, or when an expanding volume of the solidifying liquid contents of fill volume 405 exceeds a volume capacity of fill volume 405, thereby necessitating the occupation of additional volume. In some embodiments, protective interface cushion device 400 is configured such that a necessity for utilizing overflow volume 410 is accomplished by freezing the cryostorage bag in an upright position. As interchangeably used herein, the terms refer to any nearly incompressible material that conforms to the shape of its container but retains a (nearly) constant volume independent of pressure, wherein the material further forms a solid at cryogenic temperatures.

In other embodiments, protective interface cushion device 400 is configured such that a necessity for utilizing overflow volume 410 is absent. For these embodiments, protective interface cushion device 400 is configured such that a fill volume 405 is filled to a predetermined capacity, or filled near to capacity, such that the cryostorage bag may be frozen in any orientation without exceeding a capacity of fill volume 405. The various features and surfaces of upper and lower halves 401 and 402 of protective interface cushion device 400 is configured such that a size and relative position of volumes 405, 410, 415 and 420 may vary according to convenience, preference, or necessity based on a particular application. In some embodiments, protective interface cushion device 400 is configured such that an overflow volume 410 is positioned or located between the fill volume 405 and port relief area 420. In some embodiments, protective interface cushion device 400 is configured such that at least one of region 410 and 415 is absent.

Referring now to FIGS. 5A and 5B, dimensioned front and side view drawings of a representative embodiment of a laminated protective interface cushion device 500, is shown (dimensions in inches). One having skill in the art will readily recognize and appreciate that the dimensions and features of cushion device 500 may be altered as needed to accommodate use with a desired cryostorage bag. For example, in light of the present disclosure, one having skill in the art will readily recognize and appreciate that the number, shapes, depths, layers, and positions of the cutout regions 510 may be customized as desired to achieve one or more desired conformations of a cryostorage bag and the contents of the cryostorage bag following a freezing process. Accordingly, in consideration of the range of cryostorage bag products available commercially, and the range of pre- and post-freezing operations, procedures, machinery, and equipment configured for use with cryostorage bags, a multiplicity of embodiments of cushion device 500 may be realized, including, but not limited to the dimensions, shapes, and features shown in FIGS. 5A and 5B.

Referring now to FIG. 6, an empty cryostorage bag 650 is shown assembled within a protective interface cushion device 600 having one or more features previously described in connection with FIGS. 3-5, above. In some embodiments, protective interface cushion device 600 comprises a first cutout 630 providing a fill region corresponding to a fill volume 605 of a cryostorage bag 650. Protective interface cushion device 600 further comprises a second cutout 640 providing an overflow region corresponding to an overflow volume 610 of cryostorage bag 650. The outer perimeters of first and second cutouts 630 and 640 are separated by a frame protrusion or projection 625 extending inwardly from outer frame portion 623 and positioned between first and second cutouts 630 and 640. Protective interface cushion device 600 further comprises a frame or frame remnant defining an exclusion region 620 corresponding to an exclusion area (obscured portion of cryostorage bag 650 positioned behind exclusion region 620) of cryostorage bag 650.

Generally, exclusion region 620 minimizes the available volume within the exclusion area of cryostorage bag 650, such that during a freezing process a fluid within cryostorage bag 650 is precluded from accumulating within the exclusion area of cryostorage bag 650, but rather is dispersed and collected in fill volume 605 and overflow volume 610, as needed.

Figure 7A:
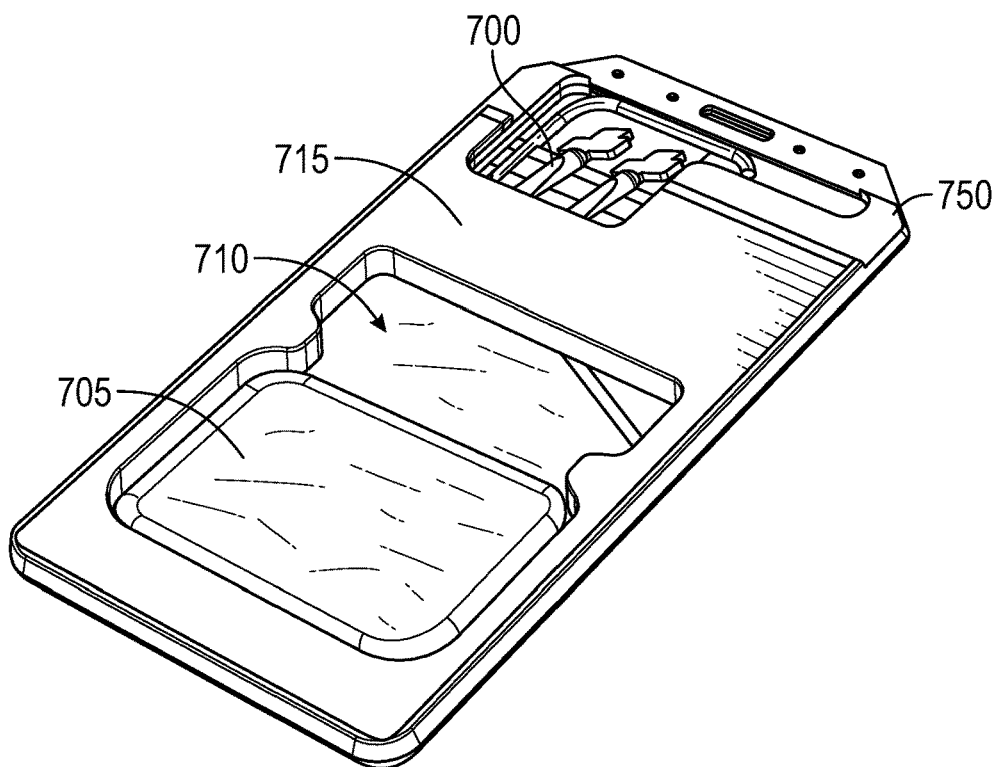
FIG. 7A shows a perspective view of a filled cryostorage bag assembled within a protective interface cushion device following a freezing process, in accordance with a representative embodiment of the present invention.
Figure 7B:
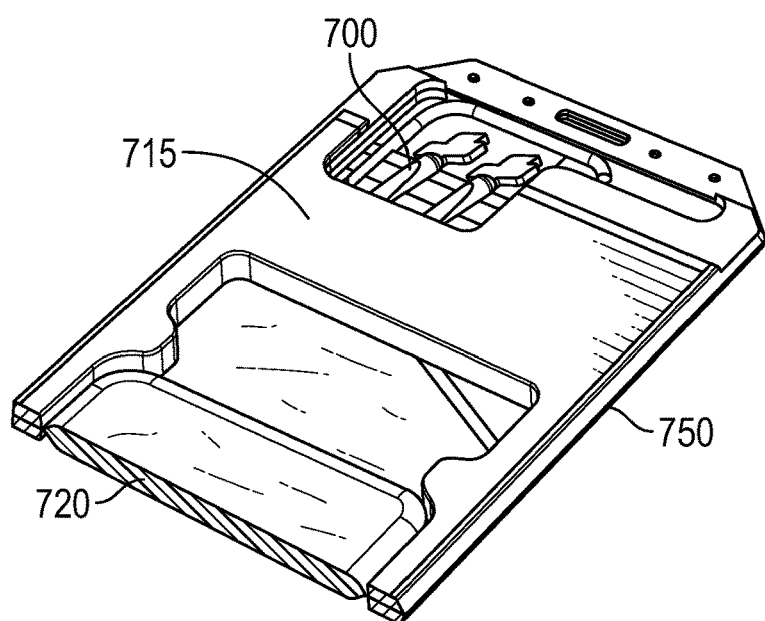
FIG. 7B shows a cross-section view of the cryostorage bag and protective interface cushion device of FIG. 7A.

Referring now to FIGS. 7A and 7B, perspective and cross-section views are provided of a cryostorage bag 700 filled to capacity and assembled within a protective interface cushion device 750 configured for freezing in an upright orientation, such that gravity draws a liquid 720 within cryostorage bag 700 into the fill volume 705 of the cryostorage bag 700 prior to solidification. As such, an overflow volume 710 of the cryostorage bag 700 is shown empty.

In some embodiments, the flat surface or exclusion area (obscured) of cryostorage bag 700 is formed by corresponding exclusion regions 715 of protective interface cushion device 750. In some embodiments, the planar or flat configuration of the various areas of cryostorage bag 700 is achieved by applying external forms (not shown) and/or external pressure to one or more of fill volume 705, overflow volume 710, and exclusion regions 715 of cryostorage bag 700, as discussed in greater detail below. In some embodiments, liquid contents in fill volume 705 provide a solid mass 720 upon freezing, as shown in FIG. 7B.

Figure 8A:
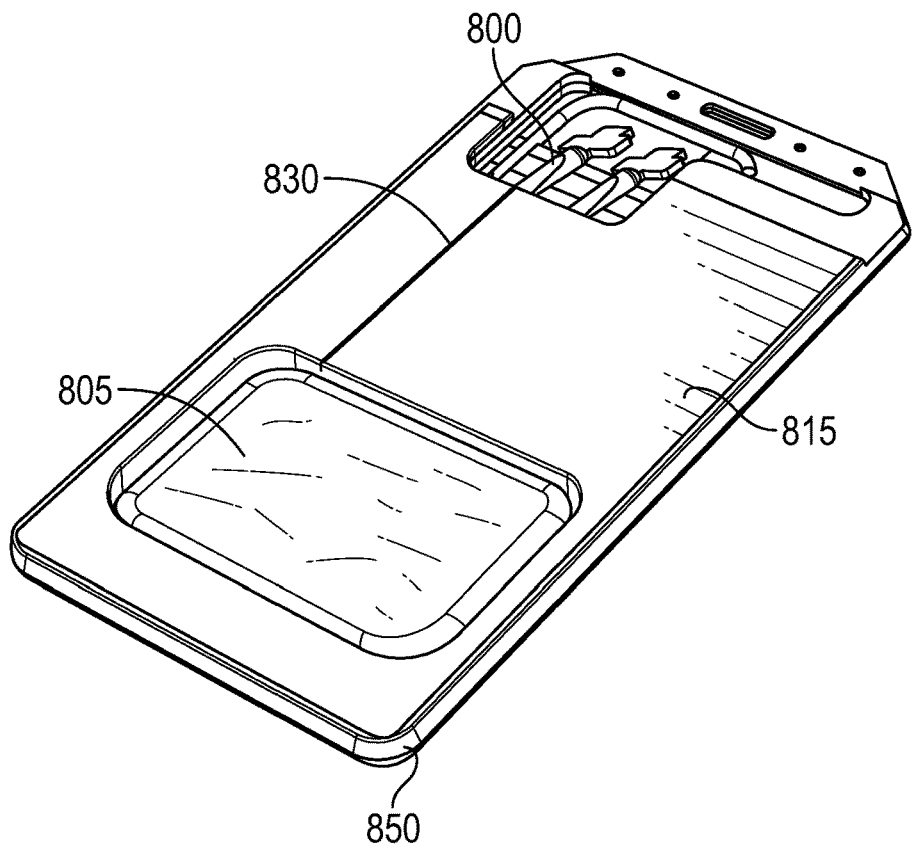
FIG. 8A shows a perspective view of a filled cryostorage bag assembled within a protective interface cushion device following a freezing process, wherein the protective interface cushion device comprises a pre-configured seam in accordance with a representative embodiment of the present invention.
Figure 8B:
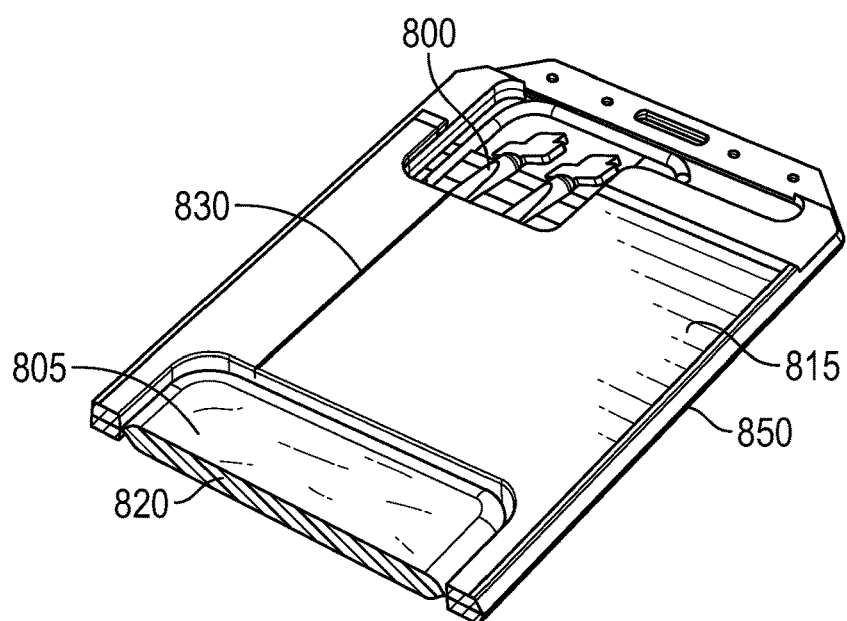
FIG. 8B shows a cross-section view of the cryostorage bag and protective interface cushion device of FIG. 8A.

Referring now to FIGS. 8A and 8B, perspective and cross-section views are provided of a cryostorage bag 800 filled to capacity and assembled within a protective interface cushion device 850 configured for freezing in a variety of orientations, including but not limited to upright and flat orientations. In some embodiments, protective interface cushion device 850 is provided without an overflow region, and is further configured to limit the total volume of fill volume 805 of cryostorage bag 800. In place of an overflow region, protective interface cushion device 850 comprises an expanded or enlarged exclusion region 815. The volume limitations and external pressures provided by exclusion region 815 displaces the entire liquid contents 820 of bag 800 into fill volume 805. Thus, liquid contents 820 are not reliant on gravity for displacement into fill volume 805. Accordingly, protective interface cushion device 850 is compatible for freezing in a variety of orientations. In some embodiments, the flat outer surfaces of fill volume 805 are achieved through the application of external forms (not shown) and/or external pressure to one or more of fill volume 805 and exclusion region 815, such as directly to a surface of cryostorage bag 800 and/or a surface of protective interface cushion device 850 corresponding to fill volume 805 and exclusion region 815.

In some embodiments, cushion device 850 further comprises a seam 830 that may be broken to provide access to, and remove cryostorage bag 800 from protective interface cushion device 850. In some embodiments, seam 830 comprises a through perforation of one or more layers of protective interface cushion device 850 to facilitate the manual severance of the cushion material to access bag 800. In one embodiment, seam 830 comprises a through perforation of an upper layer of the protective interface cushion device 850. Some embodiments may further comprise one or more fasteners configured to provide easy access and release of the cryostorage bag from the protective interface cushion device. Non-limiting examples of suitable fasteners include hook and loop closures, adhesive joints, pull-release stitch closures, complimentary inter-digitations of material, and draw-pin closures. In other embodiments, a path in the cushion material may be thinned to facilitate severance of the material using safety scissors.

Figure 9:
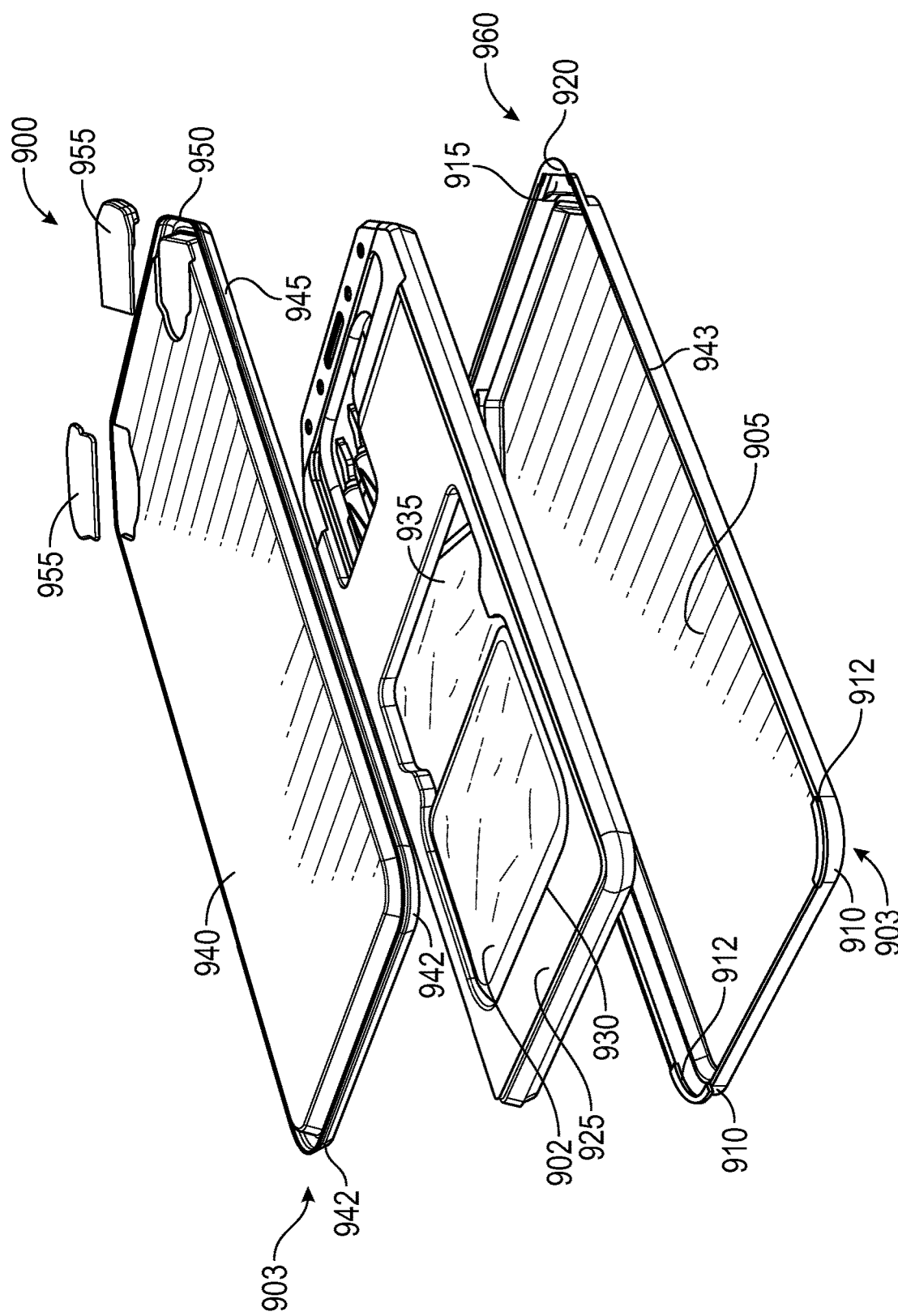
FIG. 9 shows an exploded perspective view of a cryostorage bag storage system comprising a protective interface cushion device and a protective shell having latching parts in accordance with a representative embodiment of the present invention.
Figure 10:
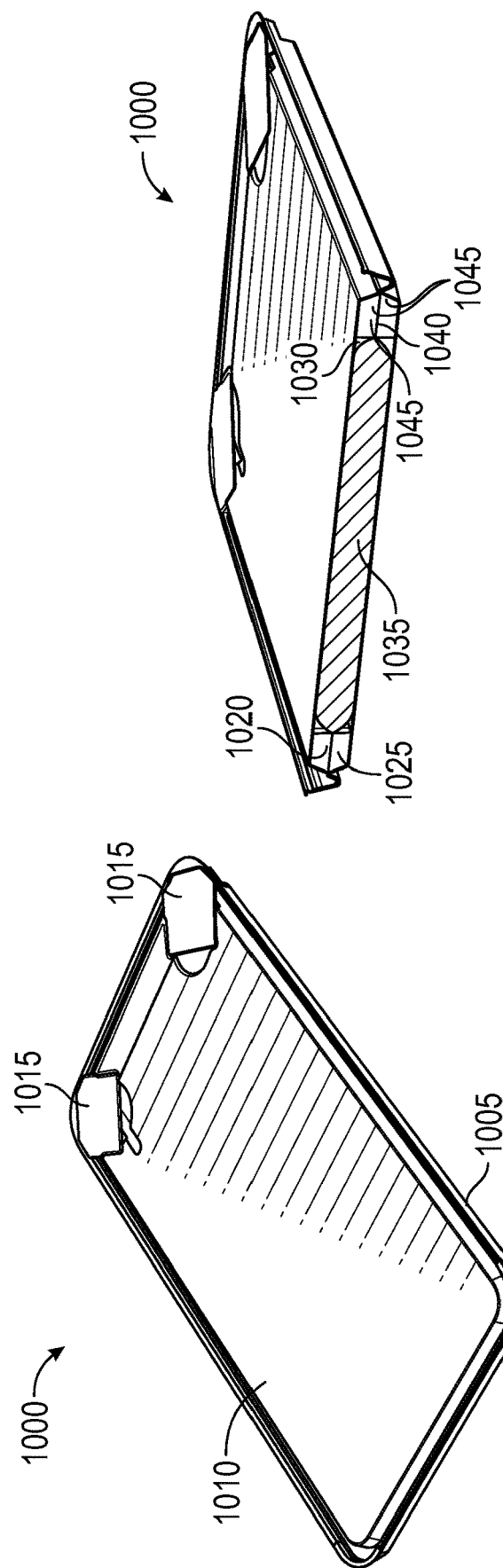
FIG. 10A shows a perspective view of an assembled cryostorage bag storage system in accordance with a representative embodiment of the present invention.
FIG. 10B shows a cross-section view of the assembled storage system of FIG. 10A.

Referring now to FIG. 9, an exploded view of a representative storage system 900 is shown. In some embodiments, a storage assembly 900 comprises a protective interface cushion device 925 configured to receive a cryostorage bag 902, and further comprising a protective shell 903 configured to receive protective interface cushion device 925.

Protective shell 903 generally comprises a lower tray 905 having a lower interior surface for securely receiving and housing an underside or bottom half of protective interface cushion device 925, and an upper lid 940 having an upper interior surface for securely receiving and housing a topside or upper half of protective interface cushion device 925. Lower tray 905 comprises a molded rim 943 that compatibly engages a molded lip 945 on upper lid 940, wherein when molded rim 943 engages molded lip 945, lower tray 905 and upper lid 940 are secured together along their perimeter edges. When secured together, the upper and lower interior surfaces of tray 905 and lid 940 comprise interior dimensions that are approximately equal to the exterior dimensions of protective interface cushion device 925, such that lower tray 905 and upper lid 940 are configured to compatibly receive and house protective interface cushion device 925 with minimum tolerances. Accordingly, lateral movement or shifting of protective interface cushion device 925 within the interior surfaces of lower tray 905 and upper lid 940 is minimized and/or eliminated.

In some embodiments, the interior surfaces of lower tray 905 and upper lid 940 comprise a structural configuration for imparting a desired form or shape to one or more portions, surfaces, or volumes of cryostorage bag 902 as part of, or during a freezing process. For example, in some embodiments at least one interior surface of lower tray 905 and/or upper lid 940 is flat. In some embodiments, the flat interior surface corresponds to the fill volume portion of a cryostorage bag 902 stored within protective interface cushion device 925, when cushion device 925 is enclosed within lower tray 905 and upper lid 940.

In some embodiments, an interior surface of lower tray 905 and/or upper lid 940 comprises a stepped surface, wherein a first portion of the stepped surface is flat and comprises a first height, and wherein a second portion of the stepped surface is flat and comprises a second height, wherein the first height is greater than the second height. In some embodiments, the first height and the second height correspond to an exclusion area and a fill volume 930 of a cryostorage bag 902, respectively, when stored within protective interface cushion device 925, when cushion device 925 is enclosed within lower tray 905 and upper lid 940. Thus, the first height may be configured to apply external pressure to the exclusion area, or reduce available headspace for thermal expansion of the liquid contents during solidification, thereby minimizing available volume in this area and directing the liquid contents to the fill volume or other portions of cryostorage bag 902. Similarly, the second height may be configured to allow for an expansion of the fill volume 930, wherein the flat surface of the second height may prevent the fill volume portion of cryostorage bag 902 from rounding or attaining a convex configuration as the liquid contents expand during solidification. In some embodiments, the stepped surface further comprises a third portion that corresponds to an overflow volume 935. In some embodiments, the first or second portions of the stepped surface corresponds to an overflow volume 935. Further still, in some embodiments a portion of interior surface of tray 905 and/or lid 940 correspond to frame remnant or other surface of protective interface cushion device 925, wherein the portion of the interior surface applies an external pressure to the frame remnant, and/or prevents expansion of a portion of the cryostorage bag 902 corresponding to the frame remnant by limiting expansion or movement of the frame remnant during a freezing process.

In some embodiments, an interior surface of lower tray 905 and/or upper lid 940 comprises at least one of a flat surface, a recessed surface, a protruded surface, a texture, a pattern, a groove, a bead, a bump, a notch, a wedge, a key, an irregular surface, a tapered surface, a convex surface, a concave surface, and an alphanumeric character.

In some embodiments, molded rim 943 of tray 905 comprises two rounded corners 910 on one end, each rounded corner housing a molded-in overhang 912, the molded rim 943 further comprising two mitered corners 960 opposite the rounded corners 910, each of the two mitered corners 960 housing a molded-in straight overhang 920 that is positioned above a flat plateau 915, which also molded into the mitered corner 960.

In some embodiments, molded lip 945 of lid 940 comprises a profile designed to snap-fit into molded rim 943 of tray 905. The two rounded corners 942 of lid 940 are configured to flex past, and become captive beneath an overhang feature 912 on rounded corners 910 of tray 905. Additionally, corners 942 of lid 940 are configured to simply drop into rounded corners 910 of tray 905. The mitered corners 950 of the lid 940 are then secured by latches 955 configured to engage the molded-in straight overhangs 920 in the two mitered corners 960, wherein latches 955 engage overhangs 920 to secure lid 940 to tray 905, as further explained below.

Protective shell 900 may comprise any material compatible for use in cryogenic applications. In some embodiments, protective shell 900 comprises a polymer material that is rigid or semi-rigid, cryogenically stable, and radiotransparent. In some embodiments, protective shell 900 comprises a material that is impact resistance and durable throughout a range of temperatures from ambient to cryogenic temperatures. In some embodiments, protective shell 900 comprises a low cost material that is single use and recyclable. In some embodiments, protective shell 900 comprises a durable material that may be reused for subsequent freezing processes. In some embodiments, protective shell 900 comprises an electromagnetic transmissible material. In some embodiments, protective shell 900 comprises a material that is compatible with disassembly and re-assembly at cryogenic temperatures. In some embodiments, protective shell 900 comprises a material having low thermal conductivity. In some embodiments, protective shell 900 is constructed a transparent polymer or polymer blend. In some embodiments, the polymer blend may be a co-polyester. In some embodiments protective shell 900 comprises a Tritan™ co-polyester plastic. In some embodiments protective shell 900 and various components thereof are constructed by vacuum or injection molding of plastic sheet material.

Referring now to FIGS. 10A and 10B, perspective and cross-section views, respectively, of an assembled storage system 1000 are shown. In some embodiments, the protective shell of storage system 1000 further comprises one or latches or tabs 1015 configured to selectively secure lid 1010 to tray 1005. In some embodiments, storage system 1000 comprises one or more tabs 1015. In some embodiments, storage system 1000 comprises two or more tabs 1015, for example, two, three, four, or greater than four tabs. In some embodiments, tabs 1015 are located on lid 1010 and/or tray 1005. In some instances, tabs 1015 are positioned in one or more corners of lid 1010. In some embodiments, tabs 1015 are positioned along one or more edges of lid 1010.

In some embodiments, latches or tabs 1015 of lid 1010 are flush with the top surface of lid 1010 when engaged with tray 1005. Accordingly, in some embodiments the top surface of lid 1010 comprises recesses for receiving at least a portion of tabs 1015 when in an engaged or locked configuration. When in the engaged or locked configuration, the engagement between the molded rim of tray 1005 and the molded lip of lid 1010, and the engagement between tabs 1015 and the straight overhangs of tray 1005 prevents separation of lid 1010 from tray 1005 during a freezing process. As shown in FIG. 10B, the interface of the upper half 1020 of the protective interface cushion device with interior surface of lid 1010, and the interface of the lower half 1025 of the protective interface cushion device with the interior surface of tray 1005 provides a rigid enclosure in which cryostorage bag 1030 is able to expand and be molded during a freezing process. As a result of a freezing process, the liquid contents 1035 of cryostorage bag 1030 expand into and against the interior surfaces of tray 1005 and lid 1010, completely filling the interior volume and leaving no gap between the two surfaces, except at the margins. Generally, the edge margins of the cryostorage bag 1030 are captive or sandwiched between the upper and lower halves or laminations 1020 and 1025, with the absolute edge 1040 of the cryostorage bag 1030 at a point which is immediately next to the stitch seam 1045 by which upper and lower halves 1020 and 1025 are joined along opposing lateral edges. Thus configured, movement of the cryostorage bag 1030 within the rigid shell or cassette is highly restricted. Further, any impact forces applied to the perimeter rim will be suppressed and distributed into the material of the upper and lower halves 1020 and 1025 of the protective interface cushion device, thereby greatly increasing the level of protection for the frozen and brittle cryostorage bag 1030.

Figure 11:
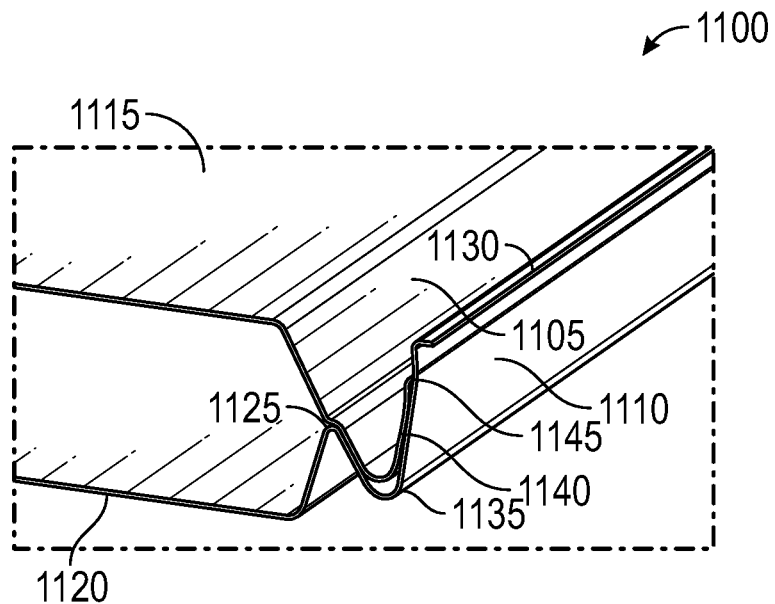
FIG. 11 shows a detailed cross-section view of the swept rim and rim features of the protective shell of a cryostorage bag storage system in accordance with a representative embodiment of the present invention.

Referring now to FIG. 11, a detailed cross-section view of a tray 1120 and a lid 1115 component of a storage system 1100 is shown. In some embodiments, tray 1120 and lid 1115 meet and engage along their respective lip 1110 and rim 1105 structures, mating at an interior path 1125 that is positioned mid-plane between the two interior surfaces of the tray 1120 and lid 1115. The tray lip profile comprises a molded side that reverses in an expanded U-shape spring gutter 1135 into which the rim counterpart 1140 of the lid 1115 is nested. The U-shaped gutter 1140 is attached on one side to the descending wall of the lid 1105 and terminates on the opposite side in a truncated flange 1145. An outermost flange 1145 of lid 1115 is compressed and outwardly biased in spring contact with the sidewall of the U-shaped gutter 1110 of tray 1120, and together the two U-shapes offer a spring resistance to lateral impact forces. As shown, the rim of lid 1115 and the lip of tray 1120 are configured to freely engage and disengage by vertical displacement. Therefore, in some embodiments lid 1115 and tray 1120 components are engaged only at their respective corners. In some embodiments, lid 1115 and tray 1120 engage one another at a contact point located between two adjacent corners.

Figure 12:
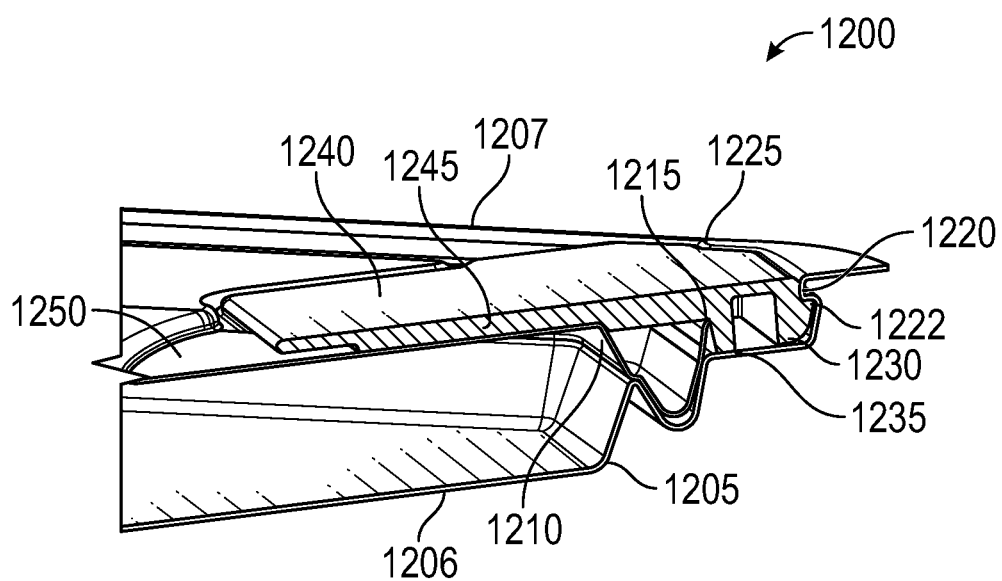
FIG. 12 shows a detailed cross-section view of a corner latch of the protective shell in an engaged configuration in accordance with a representative embodiment of the present invention.

Referring now to FIG. 12, a detailed cross-section view of latch 1240 in an engaged configuration is shown. In some embodiments, latch or closing latch 1240 comprises a lifting lever 1245 by which the latch may be disengaged from the lid and tray. The latch is configured to engage a molded undercut feature 1220 provided on the mitered corner 1205 of the tray 1206 at the forward toe projection 1222 of the latch 1240. The tray plateau plane 1235 engages a fulcrum 1230 of the latch 1240. On both of the corner projections 1225 that flank the molded undercut feature 1220 on the mitered corner 1205, the engagement of the toe 1222 path is at a position that is further distant to the linear front of the undercut feature 1220 than the fulcrum 1230. As such, as the plateau floor 1235 presses up on the fulcrum 1230, the undercut feature 1220 presses downwardly on the back curvature of the toe shelf 1222 at the corner projections 1225 resulting in a torque that attempts to rotate the latch counter-clockwise (in the view shown), thereby holding the lid 1207 captive under the latch extension 1240.

When the latch extension 1240 is lifted from the undercut edge 1245, the plateau plane 1235 will yield allowing the fulcrum 1230 to rotate around the contact points 1225 until the latch 1240 disengages from the undercut feature 1220 of the tray 1206 and is thereby released. The attachment cycle is the reverse of the detachment cycle.

In some embodiments, the lid 1207 and tray 1206 assembly include one or two latches on adjacent corners, while in other embodiments the lid and tray assembly include one or two latches on diagonally opposite corners, while in other embodiments, three or four corners of the lid and tray assembly include a latch feature 1240. In some embodiments, following the assembly of the lid 1207 and tray 1206 and closure of the latches 1240, a semi-permanent breakable label seal is placed over the latch 1240 and tray 1206 junction such that the finger access 1250 and the latch edge 1245 are obscured as a means to assure that the contents of the lid and tray assembly have not been previously opened.

Figure 13:
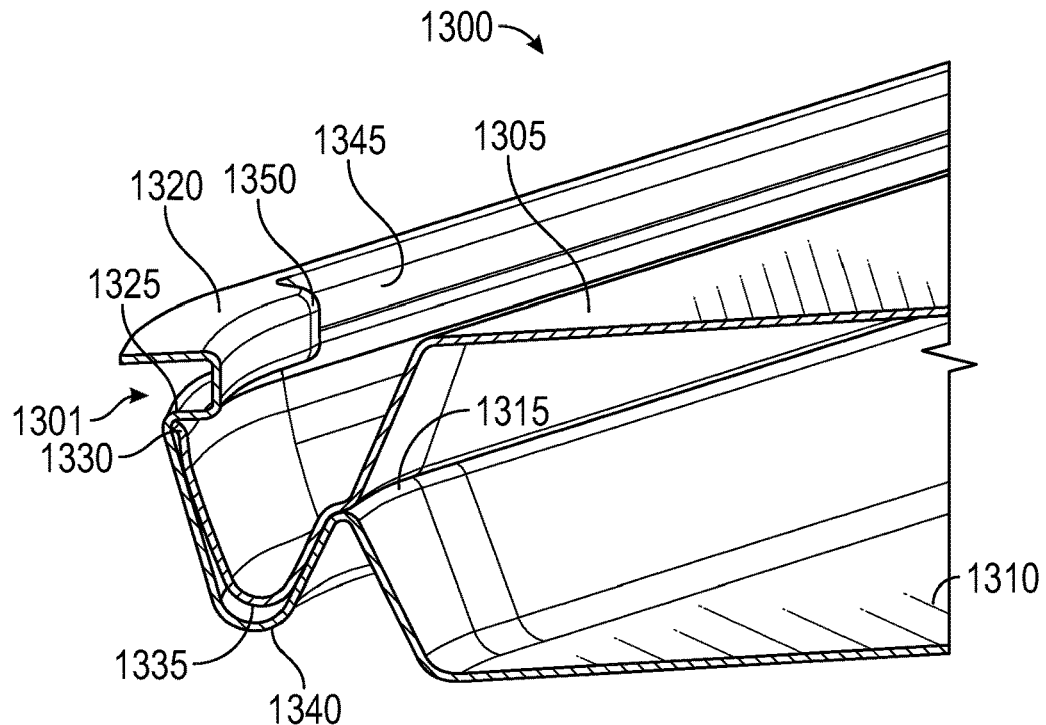
FIG. 13 shows a detailed cross-section view of a corner snap-lock engagement mechanism of the protective shell in accordance with a representative embodiment of the present invention.

Referring now to FIG. 13, a detailed cross-section end view of a rounded corner 1301 of an upper lid 1305 and a lower tray 1310 of a protective shell 1300 is shown. In some embodiments, lower tray 1310 comprises a swept rim channel 1340 that extends around a perimeter of tray 1310. In some embodiments, swept rim channel 1340 extends around an entire perimeter of tray 1310. In some embodiments, a U-shaped channel 1340 on rounded corner 1301 comprises an inset overhang feature 1320 that extends inwardly into and over a portion of U-channel 1340 thereby forming an undercut shelf 1325. In some embodiments, overhang feature 1320 is present on a single rounded corner 1301 of tray 1310. In some embodiments, overhang feature 1320 is present on two adjacent rounded corners 1301 of tray 1310.

In some embodiments, upper lid 1305 comprises a swept lip channel 1335 that extends around a perimeter of upper lid 1305. In some embodiments, a swept lip channel 1335 extends around an entire perimeter of upper lid 1305 forming a continuous lip. An outer flange 1330 of channel 1335 is configured to engage with the undercut surface 1325 and be held captive by the undercut surface 1325 such that upper lid 1305 is not easily removed from tray 1310 when a user attempts to remove upper lid 1305 while maintaining a major plane of lid 1310 in an orientation parallel to a major plane of tray 1310. During assembly, a portion of lid 1305 and outer flange 1330 contacts overhang feature 1350 as lid 1305 is pressed downwardly onto tray 1310. Contact between lid 1305 and/or outer flange 1330 and overhang feature 1350 inwardly biases outer flange 1330 and the outer wall portion of swept lip channel 1335. At the point in which opposing interior path 1330 of lid 1305 and path 1325 of tray 1340 make contact (as shown), the inward bias on outer flange 1330 and the outer wall portion of swept lip channel 1335 is released, whereupon outer flange 1330 is outwardly biased against, and snaps into undercut surface 1325. In some embodiments, outer flange 1330 and/or a portion of lip channel 1335 are temporarily deformed as outer flange 1330 moves downwardly past the face of overhang 1350. In some embodiments, outer flange 1330 of the lid 1305 is restrained and retained only at rounded corners 1301 comprising overhang 1350. At all other locations outer flange 1330 is not mechanically restrained or interconnected with tray 1310. When two of the remaining and adjacent mitered corners become unrestrained as, for example, when a latch locking feature is removed, the two unrestrained corners may be raised thereby changing the angle of the outer flange 1330 relative to the undercut surface 1325, which may result in disengagement of outer flange 1330 from undercut surface 1325. In some embodiments, a leverage force generated by raising a mitered corner of the lid 1305 (i.e., a corner positioned on the opposite end of lid 1305) induces a distortion of both lid 1305, outer flange 1330, and the overhang feature 1350, thereby allowing the various interconnected and/or contacted parts to pass by one another until the outer flange 1330 and lid 1305 is freed from undercut surface 1325 and tray 1310.

Figure 14A:
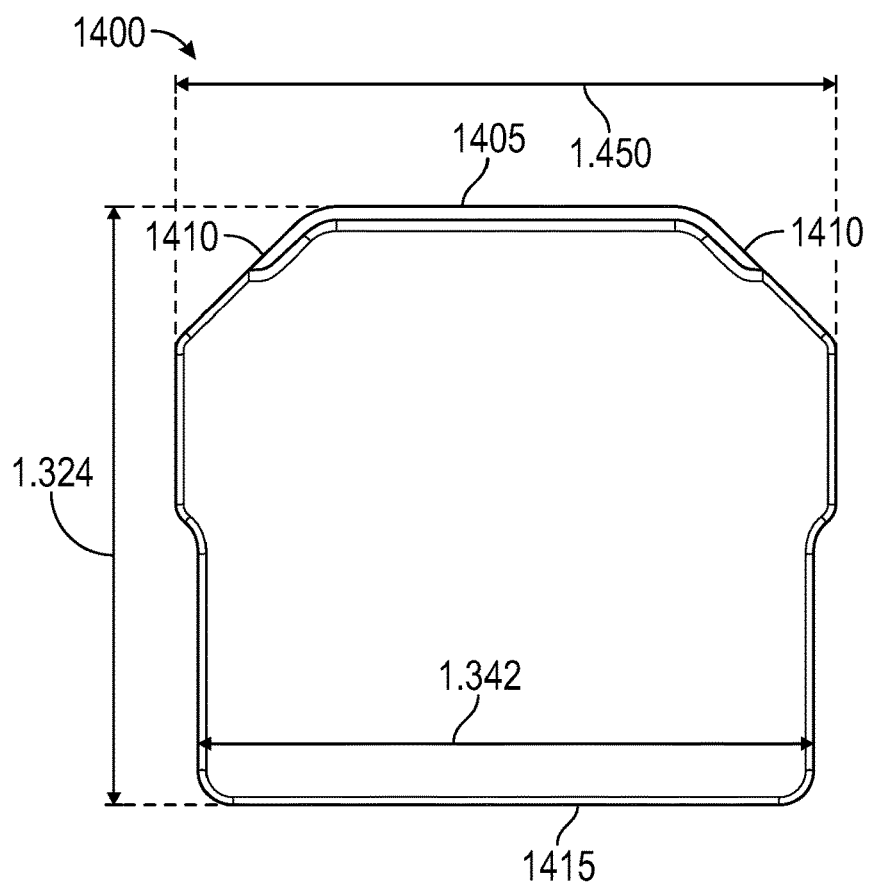
FIG. 14A shows a dimensioned drawing of a top view of a fastening latch of a protective shell in accordance with a representative embodiment of the present invention.
Figure 14B:
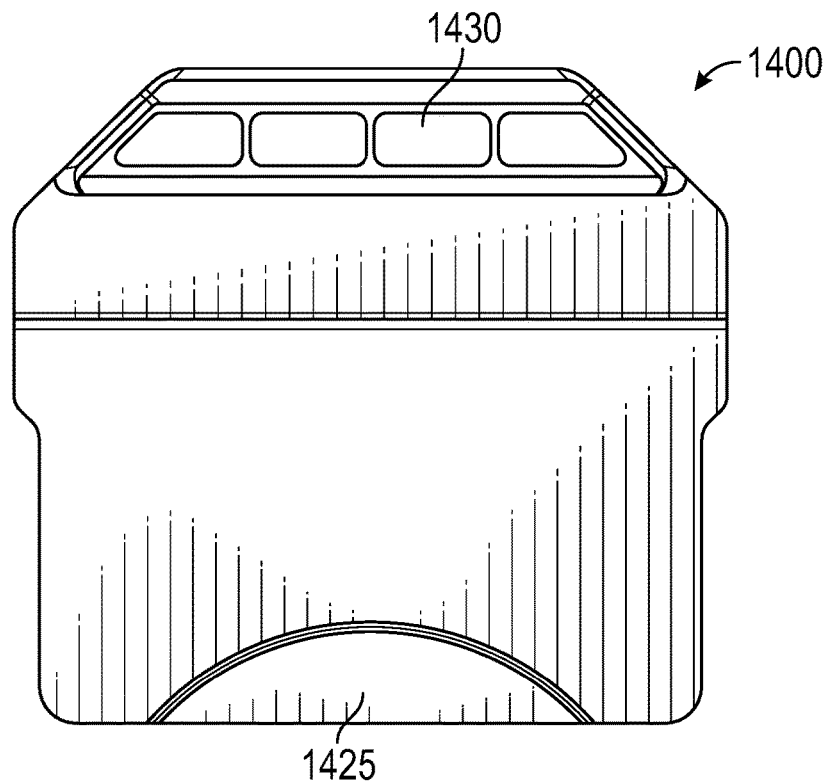
FIG. 14B shows a dimension drawing of a bottom view of a fastening latch of a protective shell in accordance with a representative embodiment of the present invention.
Figure 14C:
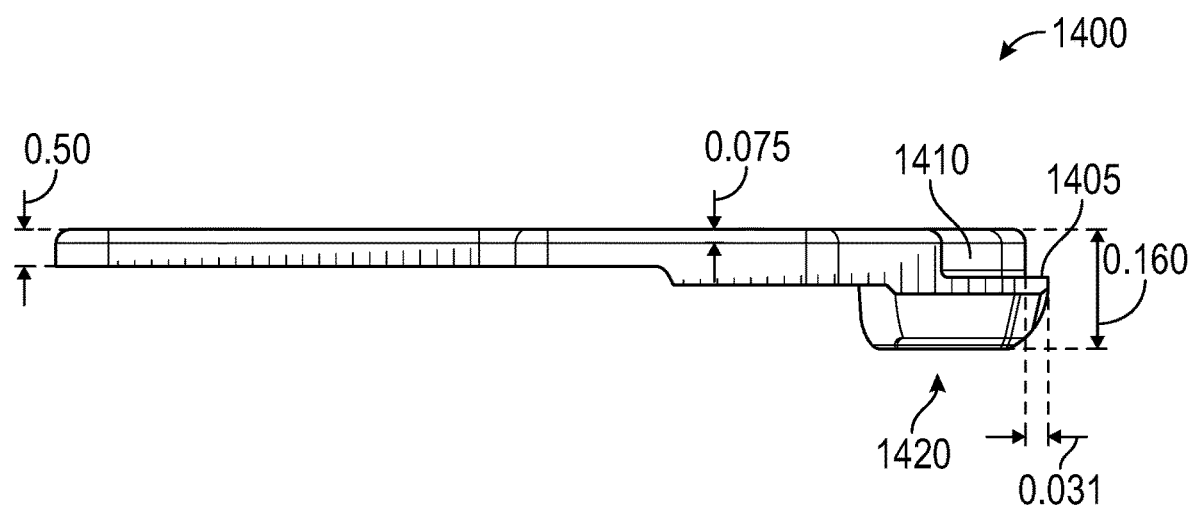
FIG. 14C shows a dimensioned drawing of a side view of a fastening latch of a protective shell in accordance with a representative embodiment of the present invention.

Referring now to FIGS. 14A, 14B and 14C, dimensioned top, bottom, and side view drawings of a representative embodiment of a latch or tab latch 1400 is shown (dimensions in inches). One having skill in the art will readily recognize and appreciate that the dimensions and features of tab latch 1400 may be altered as needed to accommodate use with a desired upper lid or protective shell. For example, in light of the present disclosure, one having skill in the art will readily recognize and appreciate that the shape, contours, thickness, length, ridges, size and scale of latch 1400 may be customized as desired to achieve a desire functionality, compatibility with an upper lid, compatibility with a lower lid, or other features and/or components of the present invention. In some embodiments, an identical or suitable performance and function of a tab latch 1400 is obtained when one or more dimensions of the tab latch 1400 is altered so as to optimally integrate with other embodiments of the lid and tray system, particularly as it pertains to the encasement of cryostorage bags of various nominal sizes.

In the top view of FIG. 14A, a toe undercut engagement surface 1405 is visible. Undercut engagement surface 1405 extends across an upper edge of latch 1400 and continues on both sides for a distance terminating at 1410 an equal and opposite location. As such, undercut engagement surface 1405 is centered across an upper edge of latch 1400.

In the bottom view of FIG. 14B, a cutout arc 1425 is shown. Terminal ends of cutout arc 1425 extend outwardly from edge 1415 (see FIG. 14A) and form an arc shape on a bottom side of tab latch 1400. In some embodiments, cutout arc 1425 facilitates engagement of edge 1415 (see FIG. 14A) by a finger or fingernail for the purpose of lifting and removing, or adjusting a position of latch 1400. In some embodiments, one or more cavities 1430 are provided on the bottom surface to reduce the polymer mass and surface shrinkage and/or denting of latch 1400 during the molding process.

Figure 15B:
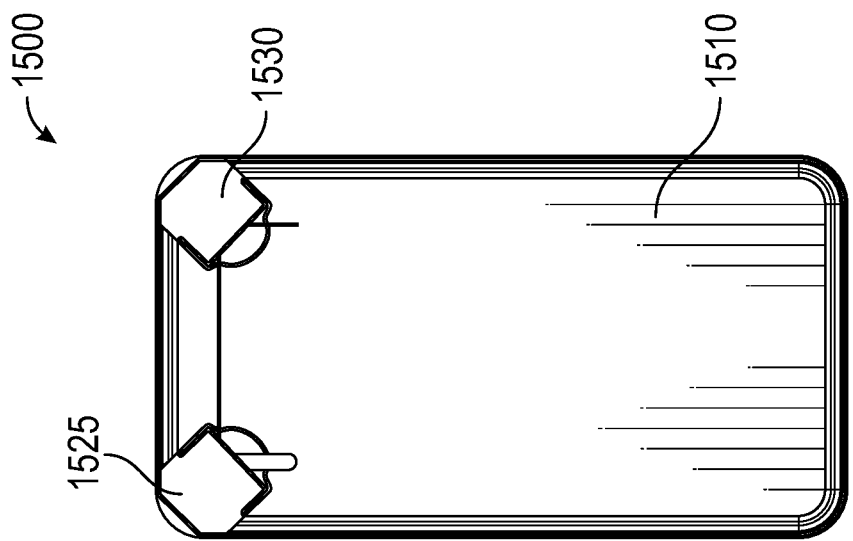
FIG. 15B shows a top view of an assembled protective shell cassette having a cutout slot and corner latches in an engaged configuration in accordance with a representative embodiment of the present invention.
Figure 15A:
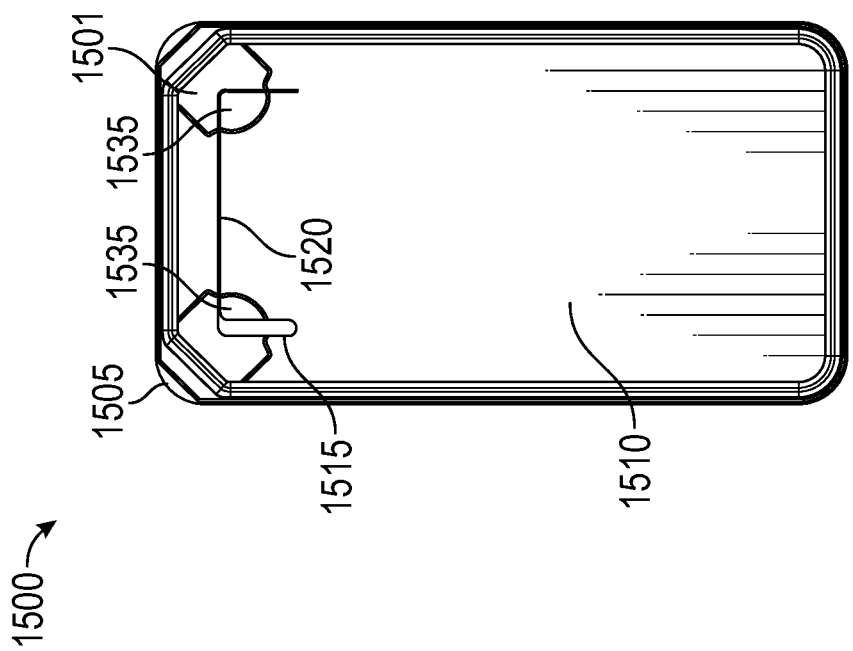
FIG. 15A shows a top view of an assembled protective shell cassette having a cutout slot in accordance with a representative embodiment of the present invention.

Referring now to FIGS. 15A and 15B, top views of a protective shell 1500 is shown, wherein protective shell 1500 comprises upper lids 1510 coupled to lower trays (obscured), said upper lids and lower trays having an internal cavity in which a cryostorage bag is installed to provide a storage system. In some embodiments, protective shell 1500 comprises one or more recesses, holes, or cutouts 1501 configured to receive a latch 1525, 1530 (latches removed in FIG. 15A to show cutouts 1501). Some embodiments comprise a cutout slot 1515 for the purpose of extending a fill tubing of the cryostorage bag to the exterior of the protective shell. Contiguous with the slot cutout 1515 is a thin cut that creates a three-sided flap 1520 in the lid 1510. In some embodiments, flap 1520 permits user access to the protective shell, protective interface cushion device, and cryostorage bag as part of a kit. For example, flap 1520 may be used to achieve external routing of a branched tubing assembly of a cryostorage bag of the kit, wherein externalization of this tubing is typically provided with commercial cryostorage bags. The storage system kit in accordance with the present invention may be utilized by first filling the cryostorage bag via a branched tubing assembly. Once the cryostorage bag is filled, the tubing may be heat sealed. In some instances, an unused bulk portion of the tubing assembly is severed and the remnant is inserted into the cassette by slightly lifting the flap 1520, slipping the tubing extension into the cavity and allowing the flap to return to its natural position. The corners of the flap 1535 may be located and secured under the latch tabs 1525, 1530 in order to prevent incidental and unintended engagement with external objects. To prevent snagging of the flap during any subsequent process, a median horizontal edge of the flap 1520 may be secured by a semi-permanent adhesive label or seal.

Referring now to FIGS. 16A, 16B and 16C, steps describing a commercial method for using a storage system of the present invention with a commercially available cryostorage bag 1601 is provided. In some embodiments, a commercial method of the present invention comprises a step for placing a commercially available cryostorage bag 1601 comprising liquid contents within a protective interface cushion device 1602, and further encasing the cryostorage bag 1601 and protective interface cushion device 1602 within a protective shell 1604. In other embodiments, a commercial method of the present invention comprises step for placing a commercially available cryostorage bag 1601 comprising liquid contents within a protective interface cushion device 1602, and excludes any step for further encasing the cryostorage bag 1601 and protective interface cushion device within a protective shell 1604. Thus, the methods and systems of the present invention may be implemented with or without protective shell 1604.

In some embodiments, the cryostorage bag 1601 is filled to a prescribed volume of liquid nearly equal to, equal to, or slightly greater than a fill volume region of the protective interface cushion device 1602. Once filled, the cryostorage bag 1602 is sealed (such as by heat sealing one or more extension tubes of the bag), and then frozen in a manner such that upon removal of the protective interface cushion device and cryostorage bag from the protective shell, the solidified liquid contents inside the cryostorage bag will be predominantly contained within the fill volume region 1620 of the protective interface cushion device 1602, such that the frozen liquid contents and corresponding areas of cryostorage bag 1601 comprises two planar surfaces within the fill volume region 1620, wherein the two planar surfaces are parallel to one another. In some embodiments a protective interface cushion device that, for this example, does not have an overfill region, and is pre-assembled (i.e., a flat empty cryostorage bag is pre-encased or pre-installed within the two major layers, or upper and lower halves of the protective interface cushion device 1601), is filled with a volume of liquid that is equivalent to a volume of the fill volume region 1611 of protective interface cushion device 1602 prior to placement of the filled cryostorage bag 1601 and protective interface cushion device 1602 into a protective shell 1604, wherein protective shell 1604 comprise interior surfaces sized, dimensioned and configured to receive protective interface cushion device 1602 and cryostorage bag 1601, and directly engage the two major plane surfaces and side surfaces of protective interface cushion device 1602, and any exposed portions or surfaces of cryostorage bag 1601. In some embodiments, any gas remaining within the cryostorage bag, after filling with liquid, is removed by withdrawing the gas through a fill tube of the cryostorage bag 1601. The fill tube is then heat sealed at a distance of approximately one to five inches from the junction of the fill tube and the cryostorage bag 1601, and a severance is made across the seal such that the seal on both sides of the severance line is intact.

In some embodiments, the cryostorage bag 1601 and protective interface cushion device 1602 assembly is then introduced into the tray of the protective shell 1604 along with any tubing extension. The lid of the protective shell is placed over the protective interface cushion device, cryostorage bag and tubing extension, after which the lid is lock-engaged with the tray as appropriate by engaging one or more corner overhang locking mechanisms, such as pressure-activated locks or by latch part engagement. In other embodiments, the cryostorage bag 1601 and protective interface cushion device 1602 assembly is not introduced into a protective shell 1604, but rather the assembly is clamped or otherwise compressed between opposing surfaces to complete a freezing process. Thus, the opposing surfaces may perform a dual function of removing heat from the assembly and maintain a desired shape or configuration of a fill volume of the cryostorage bag, as defined by the fill volume regions of the protective interface cushion device 1602. In some embodiments, the opposing surfaces provide a singular function of maintaining a desired shape or configuration of a fill volume of the cryostorage bag during a freezing process, wherein heat is removed from the assembly by a secondary source or device (such as a cooled environment).

When assembled according to at least one of the forgoing methods, regions of the protective interface cushion device 1602 corresponding to exclusion areas of the cryostorage bag 1601 will compress these areas, thereby promoting liquid within these areas to fill and occupy the fill volume of the cryostorage bag, as defined by the fill volume regions of the protective interface cushion device 1602.

When the protective interface cushion device and cryostorage bag with liquid payload) assembly 1605 (shown with optional protective shell 1604) (also referred to herein as the "freezing assembly") is introduced into an environment that is below the freezing point of the liquid, the liquid will solidify. Upon solidification, aqueous solutions expand in volume thereby exerting a substantial outward or expansive force. Accordingly, in some embodiments a method of using the present invention further comprises adding rigid restraint and/or confinement structures 1610 and 1615 to outer surfaces of the freezing assembly, as shown in FIG. 16A. In some embodiments, confinement structures 1610 and 1615 provide additional external pressure and restraint to the fill volume portions of cryostorage bag that tend to bulge and become non-planar during the freezing process. In some embodiments, confinement structures 1610 and 1615 are spaced apart and maintained at a restricted distance from one another that is identical to the thickness of the freezing assembly prior to initiating a freezing process.

In some embodiments, confinement structures 1610 and 1615 are structurally fortified to effectively resist expansion pressures that are imposed during the freezing procedure. Thusly confined, the liquid contents in the freezing assembly will expand in a direction that is parallel to the surfaces of the confining apparatus, particularly by wedging into the exclusion region, and additional areas that immediately surround the fill volume of the cryostorage bag (as defined by the fill volume region of the protective interface cushion device).

Following the solidification of the liquid inside the freezing assembly 1605, the freezing assembly may be removed from the structural confinement apparatus 1610 and 1615, and transferred to archival storage until an appropriate time to thaw the contents of the assembly. For embodiments comprising a protective shell, removal of the protective shell provides a sub-assembly comprising the cryostorage bag and contents and the protective interface cushion device, wherein the sub-assembly comprises a frozen mass that predominately occupies the fill volume 1620 of the cryostorage bag 1601 corresponding to the fill region 1611 of the protective interface cushion device 1602. This same effect is achieved for embodiments that do not comprise a protective shell, wherein the frozen mass that predominately occupies the fill volume 1620 of the cryostorage bag 1601 corresponding to the fill region 1611 of the protective interface cushion device 1602 is provided upon removal of the freezing assembly from confinement structures or structure confinement apparatus 1610 and 1615. In some embodiments, the frozen mass further comprises planar surfaces on both sides 1625 of the cryostorage bag, as determined by the size, shape, and configuration of fill volume region 1611. Although shown in an upright orientation, a freezing assembly of the present invention devoid of an overfill volume may undergo a freezing step in any orientation with an identical outcome.

The application of the described methodology in combination with the freezing and confinement apparatus described will consistently produce a frozen mass having desired dimensions, as described above. The advantages of thusly molding the frozen mass with the described geometric properties are manifold. First, the assembly shown in FIG. 16B may be handled safely with minimal personal protection. The low thermal conductivity of the material of the protective interface cushion device will not sufficiently conduct heat at a rate that will quickly cause freezing injury, even when the material is initially at cryogenic temperature. The friction coefficient of the laminar material will be substantially greater than that of the surface of the cold cryostorage bag, therefore handling the assembly of FIG. 16B greatly reduces the likelihood of accidental dropping, as compared to an independent frozen cryostorage bag.

Additional advantages of the present invention include the compatible use of thawing instruments with multiple advantageous features and properties that may be customized for use with a molded cryostorage bag and frozen contents of the present invention. For example, in one embodiment a protective interface cushion device and protective shell are customized to provide a molded cryostorage bag and frozen contents having dimension specifically selected for compatible use with a thawing system and instruments. In one embodiment, a frozen sample configuration is provided for easy access and compatibility with an access port of a thawing device, wherein the molded cryostorage bag and frozen contents may be inserted, such as via a single, quick motion, thereby reducing an opportunity for any delay or step repetition due to complexity of procedure, which may inadvertently impose transient and inconsistent warming during the initiation of the thawing process at the step of loading the sample in the thawing instrument. In one embodiment, a position of the inserted frozen mass relative to the assembly boundary is known, whereby a thawing instrument is constructed to include dedicated heater blocks positioned relative to the known location and area of the fill volume. In some embodiments, heater blocks are positioned to contact two or more sides of the fill volume area simultaneously. In some embodiments, the thawing instrument is further optimized to apply a clamping pressure to the known location of the frozen mass thereby greatly enhancing the rate of thermal energy influx into the frozen liquid payload. In some embodiments, as the frozen payload liquefies, a clamping pressure forces liquid away from the frozen mass and to the exclusion region. In some embodiments, a protective shell of the present invention is easily and readily removed at any point following the freezing procedure. No longer confined by a protective shell, the softer material of the protective interface cushion device decompress and expand, thereby allowing thawed liquid to flood into the exclusion region and act as a transient storage reservoir for the liquefied contents.

Further, in some embodiments a method of thawing the frozen liquid payload is achieved without the use of a heater block adjacent to the exclusion region so that a temperature that is slightly above the melting temperature is maintained in this region.

In some embodiments, an apparatus of the present invention is optimized for use with a thawing apparatus configured for use with cell types that benefit from a minimal transit time between cryogenic temperatures and the melting temperature. Thus, one or more dimensions of an apparatus of the present invention may be configured to permit the high thermal energy influx over a short transit interval.

In some embodiments, a termination of a thaw process may be determined simply based upon the distance between the two heater blocks, as a preset minimum gap is configured to signal a completion of the thaw process. The pre-configuration by this method of the frozen mass in advance of the thawing process allows the greatest level of uniformity and consistency in the thawing process and therefore optimizes and insures a common, predictable and repeatable outcome and viability of reanimated live cell therapeutics over a system of distributed venues, particularly in view of the variation in skill set and breadth of technique that is likely to accompany such conditions.

Figures 17A, 17B:
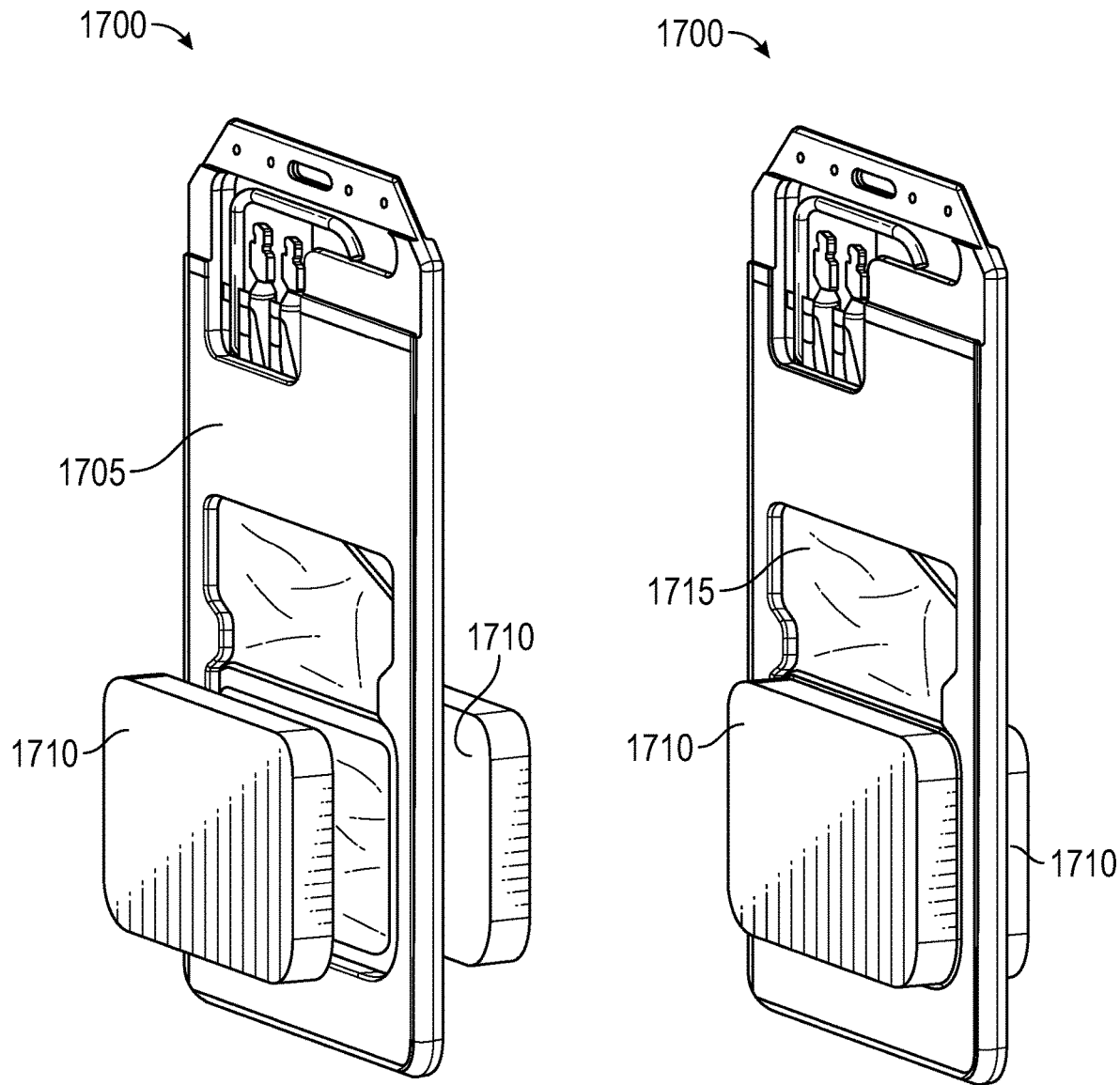
FIG. 17A shows a perspective view of a cryostorage bag within a protective interface cushion in proximity to external thawing instrument components prior to a thawing procedure in accordance with a representative embodiment of the present invention.
FIG. 17B shows a perspective view of a cryostorage bag within a protective interface cushion in contact with external thawing instrument components and undergoing a thawing procedure in accordance with a representative embodiment of the present invention.

Referring now to FIGS. 17A and 17B, a pair of drawings are presented to illustrate elements of an embodiment of a thawing device that may be used with the protective interface cushion device 1705 and cryostorage bag assembly, as previously described, following the freezing of the contents of the bag according to the method of this invention. With reference to FIG. 17A, a protective interface cushion device and cryostorage bag assembly with a molded parallel planar solid payload occupying the fill volume of the protective interface cushion device, is shown 1700. In some embodiments, a starting position of two representative thermally conductive heater blocks 1710 is in a retracted, non-contact orientation relative to the surface of the cryostorage bag. In the execution of the method of the invention, the two heater blocks 1710 comprising planar contact surfaces comprise a means by which thermal energy would be introduced into the blocks in a controlled manner, such that the temperature of the blocks and the wattage of the thermal conductive output of the blocks may be regulated. In some embodiments, heater blocks 1710 are energized and brought to a preset temperature prior to insertion of the frozen laminated cushion and, cryostorage bag therebetween. In some embodiments, the two blocks are positioned, such that the planar surfaces of the cryostorage bag in the region of the fill volume are parallel to the planar surfaces of the heater blocks. In some embodiments, the side planes of the heater blocks and the boundary of the fill volume of the protective interface cushion device are coincident.

Following the described positioning of the elements shown in FIG. 17A, a mechanism of the thawing instrument is configured to advance the heater blocks 1710 until contact is made between the planar surfaces of the heater blocks and the opposing planar surfaces of the cryostorage bag. At this step, the mechanism of the thawing instrument applies a compressive clamping force to the heater blocks to create pressure on the heater block and cryostorage bag surface interfaces. In some embodiment, this applied pressure optimizes the transmission of thermal energy from the heater blocks to the cryostorage bag and frozen and/or liquid contents.

In some embodiments, the material of the cryostorage bag warms quickly at the surface and the flexibility of the material increases upon heating, thereby allowing the bag material to act as a gap-filler at the interface between the heater block and the cryostorage bag. In some embodiments, this interface optimizes thermal energy transmission across this interface. As the temperature of the cryostorage bag contents increases, the contents approach a phase change temperature of the solid, and the frozen liquid contents begin to liquefy. In some embodiments, the liquid in the compressed interface immediately flows to an interior of the cryostorage bag. In some instance, the interior of the cryostorage bag is located adjacent to an exclusion area of the cryostorage bag, as determined by the size, position, shape and location of the exclusion region of the protective interface cushion. Removal of the liquid perpetuates contact between the remaining solid contents presented at the interior surface of the cryostorage bag in contact with the heater block. In some embodiments, the exclusion area 1715 of the cryostorage bag is not heated. Accordingly, a temperature of the liquid gathered in the exclusion area will remain relatively constant.

By this continuous process, the temperature of the liquid will remain very close to the melting temperature of the solid material and a high rate of thermal influx to the cryostorage bag system may be imposed, limited only by the wattage output capacity of the heater block systems. By the application of this method, both the temperature transition of the cryostorage bag contents from cryogenic temperatures to the melting temperature and the duration of the phase change of the solid material will be minimized. For cell types that exhibit maximum viability when thawed with a minimal temperature transition duration, the application of this method will be of great benefit. In addition, the reduction in thaw time and the potential for predictable and consistent performance, in addition to the increased safety and ease of use offered by this method will be of substantial benefit in both clinical and research venues wherein this method may be applied.

Referring now generally to FIGS. 18A to 18E, a system and accompanying method is provided whereby a flexible cryostorage bag is sequentially i) positioned within a vessel assembly comprising a pair of cushion elements and frame elements, ii) accessing and filling the interior region of the cryostorage bag with a volume of fluid, iii) the volume of fluid is sealed within the cryostorage bag, iv) excess portions of the cryostorage bag are trimmed away, v) spacers are fitted into windows of the frame elements and in contact with the cryostorage bag, vi) the volume of fluid is restricted to a region of the cryostorage bag as defined by the cushion elements, frame elements, and spacers, vii) the vessel assembly and spacers are confined between two rigid, thermally conductive plates, and viii) the volume of fluid is frozen, wherein the frozen contents of cryostorage bag comprise a solid shape as defined by the cushion elements, frame elements, spacers, and the rigid, thermally conductive plates. Thus, in some embodiments a system and/or method is provided for shaping a liquid material within a cryostorage bag while undergoing a freezing procedure.

Figure 18A:
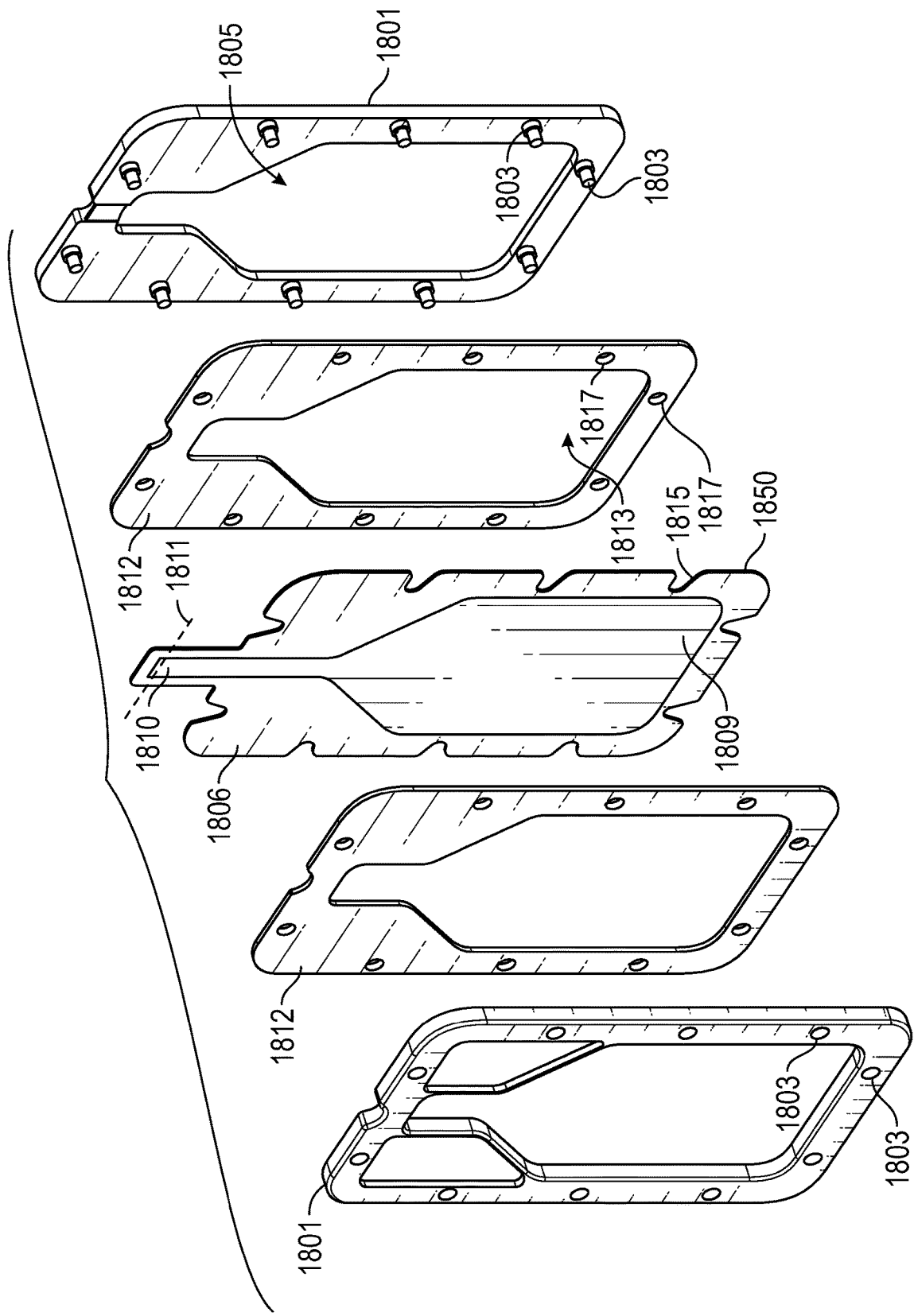
FIG. 18A shows an exploded perspective view of a vessel assembly and cryostorage bag in accordance with a representative embodiment of the present invention.

Referring now to FIG. 18A, a flexible cryostorage bag 1850 is shown in an empty state, or prior to being filled with a fluid. This figure further shows cushion elements 1812 and frame elements 1801 in an exploded configuration. Cryostorage bag 1850 may comprise any features or elements of any cryostorage bag disclosed herein. Generally, cryostorage bag 1850 comprises two layers of single or laminated material that are bounded together by a sealed area 1806, wherein the sealed area completely surrounds and encapsulates an interior region 1809. In some embodiments, a cryostorage bag comprises a sealed perimeter defining an interior region configured to receive a liquid material, wherein said interior region comprises an inner perimeter shape.

In some embodiments, interior region 1809 comprises an access channel 1810 through which interior region 1809 may be filled after severing or otherwise removing an end portion of the sealed area 1806, such as at path 1811. Once a distal end of access channel 1810 is severed or otherwise removed, access channel 1810 provides a pathway such that interior region 1809 is in fluid communication with an exterior environment of cryostorage bag 1850 via access channel 1810.

Cushion elements 1812 are further provided. In some embodiments, cushion elements 1812 comprise a soft material that remains flexible at cryogenic temperatures. In some embodiments, cushion elements 1812 comprise a polypropylene felt material. In some embodiments, cushion elements 1812 comprise a desired cut-out shape 1813. In some instances, cut-out shape 1813 is a single shape. In some instances, the single shape of cut-out shape 1813 is approximately the same shape as interior region 1809 of cryostorage bag 1850. In some instances, cut-out shape 1813 comprises two or more shapes, wherein at least one of the shapes is different than the shape of interior region 1809. Cushion elements 1812 further comprise an outer perimeter.

In some embodiments, cushion elements 1812 comprise a plurality of fasteners 1817 spaced and arranged about a perimeter of cushion elements 1812. In some embodiments, fasteners 1817 comprise a plurality of guide holes formed through a thickness of cushion elements 1812 and configured to receive a rivet, such as a plastic rivet. Generally, all fasteners 1817 of each cushion element are aligned such that when cryostorage bag 1850 is sandwiched between cushion elements 1812, fasteners 1817 are aligned. In some embodiments, sealed area 1806 of cryostorage bag 1850 comprises one or more features to accommodate fasteners 1817. For example, in some embodiments sealed area 1806 comprises indents 1815 corresponding to the various positions of fasteners 1817. In some embodiments, sealed area 1806 comprises a plurality of holes corresponding to the various positions of fasteners 1817.

Frame elements 1801 are further provided. In some embodiments, frame elements 1801 comprise a rigid material having a window 1805 that is generally the same shape as the cut-out shape 1813. In some embodiments, frame elements 1801 comprise a plastic material. In some embodiments, the plastic material is a co-polyester blended material. In some embodiments, frame elements 1801 comprise an outer perimeter that is approximately the same as the outer perimeter of the cushion elements.

In some embodiments, frame elements 1801 comprise a thickness that is greater than cushion elements 1812. In some embodiments, a combined thickness of frame elements 1801 and cushion elements 1812 is approximately greater than or equal to a desired thickness for frozen contents of cryostorage bag 1850.

Figure 18B:
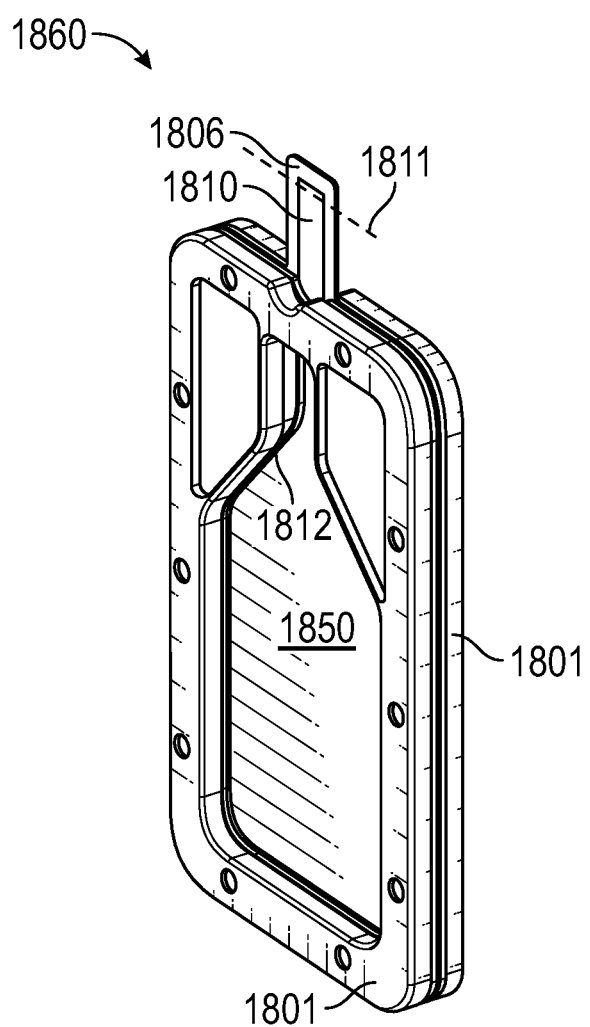
FIG. 18B shows a perspective view of the assembled vessel assembly of FIG. 18A.

Frame elements 1801 further comprise a plurality of fasteners 1803 spaced and arranged about a perimeter of frame elements 1801. In some embodiments, fasteners 1803 comprise a plurality of plastic rivets arranged and configured to compatibly insert within fasteners 1817 of cushion elements 1812. In some instances, fasteners 1803 couple with fasteners 1817 via mechanical interference. In some embodiments, fasteners 1803 couple with fasteners 1817 via a plastic weld. In some embodiments, a first frame element comprises a plurality of plastic rivets, and an oppositely positioned second frame elements comprises a plurality of guide holes, wherein the rivets and guide holes are arranged for insertion of the rivets through the guide holes, whereby the first and second frame elements are coupled together via the rivets and guide holes, such as by thermal deformation. In some embodiments, fasteners 1817 are further arranged for insertion of the rivets therethrough, whereby the frame elements 1801 sandwich the cushion elements 1812 and cryostorage bag 1850 to provide a vessel assembly 1860, as shown in FIG. 18B.

Figure 18C:
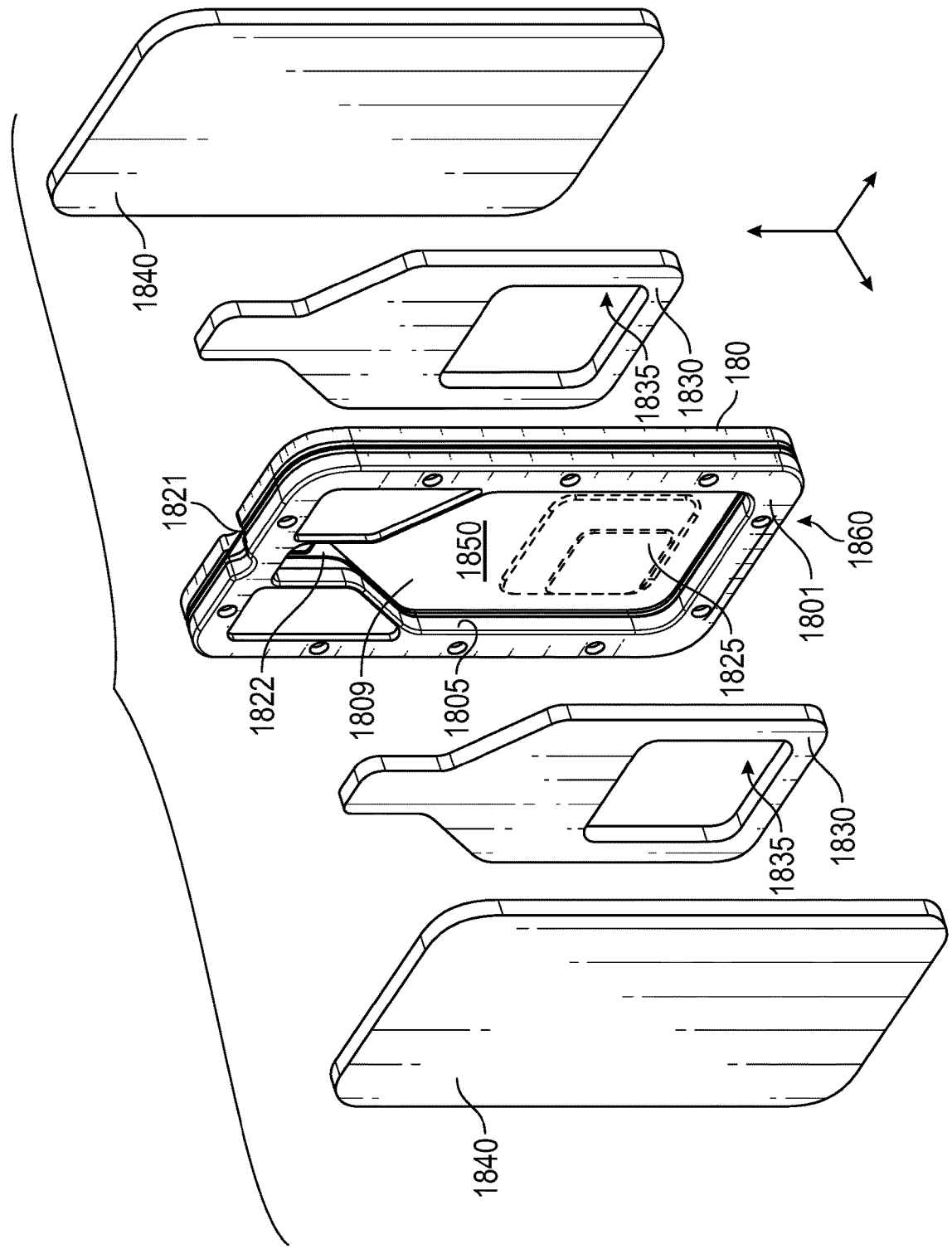
FIG. 18C shows an exploded perspective view of cushion elements and thermal conductive plates prior to being assembled onto a vessel assembly in accordance with a representative embodiment of the present invention.

Referring now to FIG. 18C, vessel assembly 1860 is shown subsequent to cryostorage bag 1850 being filled with a fluid. The process for filing cryostorage bag 1850 with a fluid entails accessing the interior region 1809 by cutting or otherwise removing a portion of access channel 1810, such as at path 1811. Once removed, a fluid may be added to interior region 1809 via access channel 1810. Once the interior region 1809 has been filled with a desired volume of fluid, access channel 1810 is sealed, such as by a heat sealer. In some embodiments, access channel 1810 is sealed in close proximity to frame elements 1801, such that when an excess portion of access channel 1810 is removed from cryostorage bag 1850, a minimal length of access channel 1810 extends beyond the outer perimeter of frame elements 1801. In some embodiments, access channel 1810 is sealed and trimmed such that the trimmed access channel 1810 is approximately flush with an outer perimeter of frame elements 1801. In some embodiments, access channel 1810 is sealed at a first position 1821 distal to interior region 1809, and further sealed at a second position 1822 proximal to interior region 1809.

In preparation for freezing the fluid contents of cryostorage bag 1850, a pair of spacers 1830 are fitted within windows 1805 of frame elements 1801. Spacers 1830 comprise a flexible material, such as a polypropylene felt material. In some embodiments, spacers 1830 are compressible. Spacers 1830 comprise an outer shape that is approximately equal to windows 1805, such that spacers may fit within and substantially fill the perimeter of windows 1805 with minimal tolerance. Spacers 1830 further comprise a thickness that is equal to or less than a thickness of frame elements 1801.

In some embodiments, spacers 1830 further comprise an opening 1835 having a desired shape. Generally, the shape and dimensions of opening 1835 are selected to achieve a desired two- or three-dimensional solid shape 1825 of the fluid and expanded walls of the cryostorage bag 1850 upon freezing of the fluid contents isolated to a restricted region 1825 of the interior region 1809. Upon freezing, the fluid contents experience a thermal expansion that biases the walls of the cryostorage bag 1850 outwardly, through the cushion elements 1812 and the frame elements 1801, and into contact with the spacers 1830. The expansion of the fluid (and the cryostorage bag in which the fluid is contained) in the first and second dimensions (i.e., along the x- and y-axis) is controlled by the rigid constraints of windows 1805 of frame elements 1801. The expansion of the fluid in the third dimension (i.e., along the z-axis) is controlled by sandwiching the spacers 1830 and the vessel assembly between rigid, thermally conductive plates 1840, as shown in FIG. 18D.

Figure 18D:
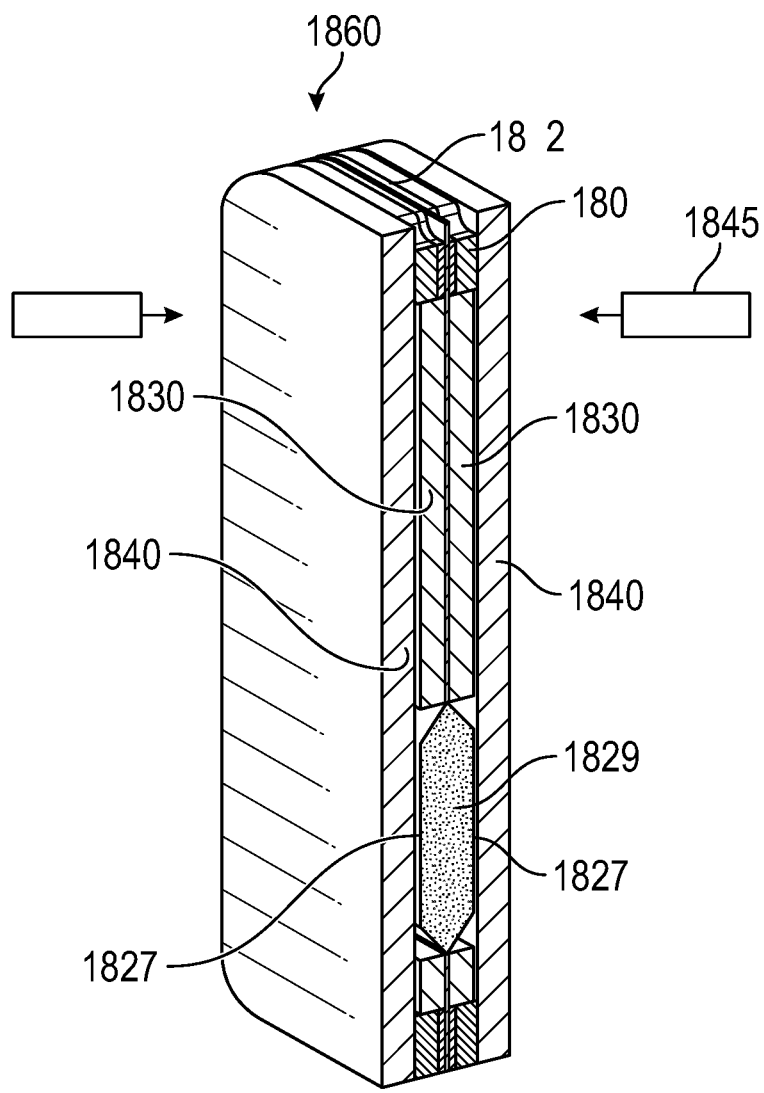
FIG. 18D is a cross-section view of the cushion elements and thermal conductive plates assembled together with a vessel assembly in accordance with a representative embodiment of the present invention.

Referring now to FIG. 18D, vessel assembly 1860 and spacers 1830 are confined between two rigid and thermally conductive plates 1840, and held in place with a clamping structure 1845. In some embodiments, thermally conductive plates 1840 comprise an outer perimeter that is approximately the same as the outer perimeter of the cushion elements. The clamped assembly is placed into a low temperature environment, wherein the fluid located within the restricted region 1829 of interior region 1809 solidifies into a solid mass with two planar and parallel surfaces 1827 at the area of contact or interface of the cryostorage bag 1850 with the thermally conductive plates 1840. In some embodiments, the thermally conductive plate 1840 comprise a metal material, such as, for example, an aluminum alloy.

Figure 18E:
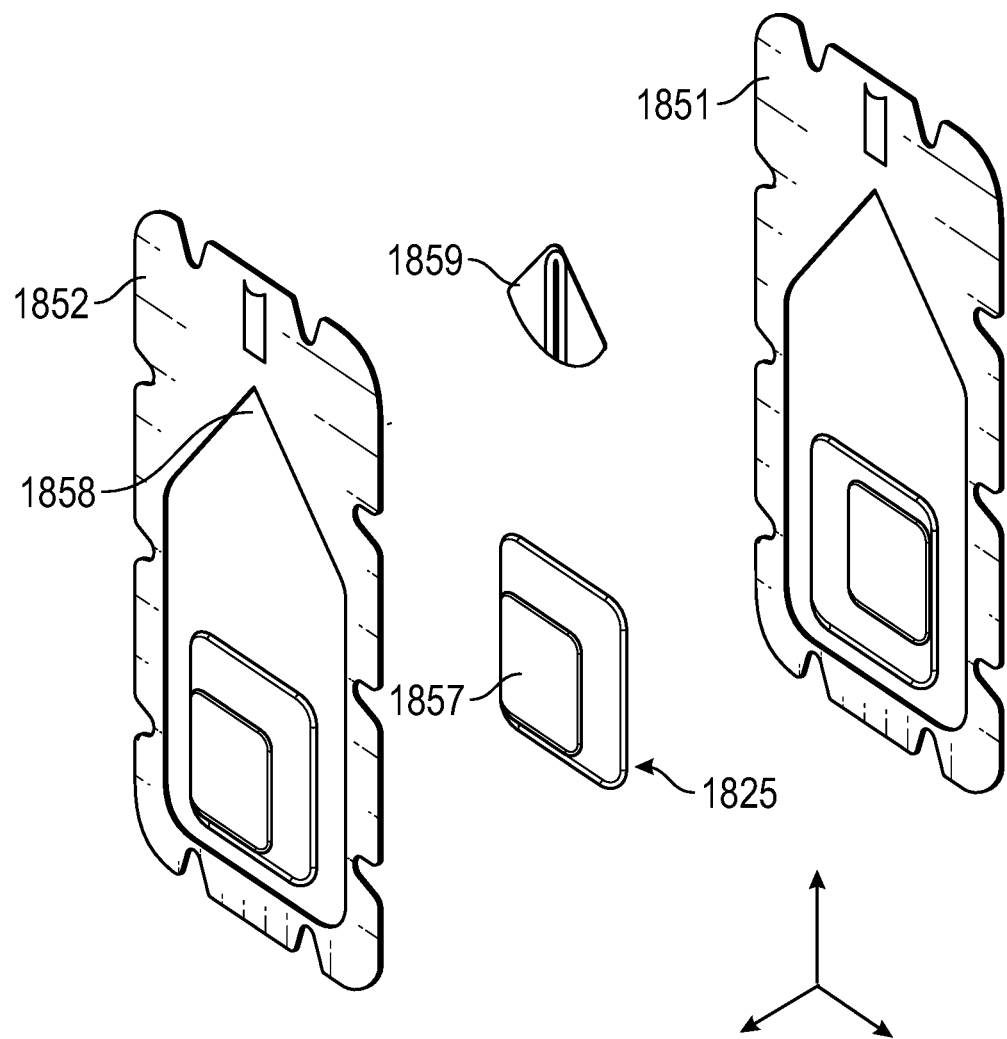
FIG. 18E is an exploded perspective view of a cryostorage bag, wherein the frozen contents of the cryostorage bag comprise a desired shape in accordance with a representative embodiment of the present invention.

Referring now to FIG. 18E, an exploded view of the frozen fluid contents of the cryostorage bag 1850 are shown, wherein the two layers 1851 and 1852 of bag 1850 are separated for clarity. According to one or more embodiments of the present invention, the frozen fluid contents of cryostorage bag 1850 comprise a desired 3-dimensional solid shape 1825 as defined by at least one of cushion elements 1812, frame elements 1801, spacers 1830, and rigid, thermally conductive plates 1840, as described herein. In some embodiments, solid shape 1825 comprises a first and second dimensions (i.e., along the x- and y-axis) that is controlled by the rigid constraints of windows 1805 of frame elements 1801, and further comprises a third dimension (i.e., along the z-axis) that is controlled by the rigid constraints of the thermally conductive plates 1840. In some embodiments, the resulting 3-dimensional solid shape 1825 is a generally square or rectangular outline having two opposing major planar and parallel surfaces 1857. In some embodiments, surfaces 1857 are contacted by a heating element during a thawing process. Following a thawing of the frozen contents of cryostorage bag 1850, the fluid contents may be withdrawn by means of a hypodermic needle at the location of 1858. In some embodiments, cryostorage bag 1850 further comprises an interior shield 1859 placed within interior region 1809 at the access location 1858, wherein interior shield 1859 prevents unintentional penetration of both bag layers when accessing the fluid contents with a hypodermic needle.

The foregoing discussion of the invention has been presented for purposes of illustration and description. The foregoing in not intended to limit the invention to the form or forms disclosed herein. Although the description of the invention has included description of one embodiment and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those disclosed herein, and without intending to publicly dedicate any patentable subject matter.

The invention claimed is:

1. A system for shaping a liquid material within a cryostorage bag while undergoing a freezing procedure, said system comprising:
   a cryostorage bag having a sealed perimeter defining an interior region configured to receive a liquid material, said interior region having an inner perimeter shape;
   a pair of cushion elements having an outer perimeter and comprising a cut-out shape that is approximately the same shape as the inner perimeter shape of the interior region of the cryostorage bag, said pair of cushion elements being configured to sandwich the cryostorage bag between the pair of cushion elements;
   a pair of frame elements having an outer perimeter that is approximately the same as the outer perimeter of the pair of cushion elements, and comprising a window having a desired shape, wherein the position of the window approximately corresponds to the interior region of the cryostorage bag when the cryostorage bag and the pair of cushion elements are sandwiched between the pair of frame elements, wherein the cryostorage bag, the pair of cushion elements and the pair of frame elements provide a vessel assembly when the cryostorage bag and the pair of cushion elements are sandwiched between the pair of frame elements;
   a pair of spacers having an outer perimeter that is approximately the same as the desired shape of the window such that the pair of spacers may be seated within the window of the pair of frame elements with minimal tolerance; and
   a pair of thermally conductive plates having an outer perimeter that is approximately the same as the outer perimeter of the pair of cushion elements, and comprising a planar inner surface, wherein pair of thermally conductive plates are configured to sandwich the vessel assembly and pair of spacers together during a freezing procedure.

2. The system of claim 1, wherein the pair of cushion elements are flexible at a cryogenic temperature.

3. The system of claim 1, wherein the pair of spacers are flexible at a cryogenic temperature.

4. The system of claim 1, wherein the pair of cushion elements comprises a thermoinsulative material.

5. The system of claim 1, wherein the pair of spacers comprise a thermoinsulative material.

6. The system of claim 1, wherein the pair of frame elements are rigid.

7. The system of claim 1, wherein the desired shape is a rectangle.

8. The system of claim 1, wherein the desired shape determines a length and a width of a solid shape of the liquid material following a freezing procedure.

9. The system of claim 8, wherein when the vessel assembly and the pair of spacers are sandwiched between the thermally conductive plates, a distance between the planar inner surfaces of the thermally conductive plates determines a height of the solid shape.

10. The system of claim 1, wherein the cryostorage bag, the pair of cushion elements, and the pair of frame elements are secured together with a fastener to provide the vessel assembly.

11. The system of claim 10, wherein the sealed perimeter comprises a plurality of indents configured to permit passage of the fastener.

12. The system of claim 10, wherein the fastener comprises a plurality of rivets and guide holes.

13. The system of claim 12, wherein the rivets are plastic and are secured within the guide holes by thermal deformation.

14. The system of claim 1, further comprising a clamping structure configured to press the thermally conductive plates inwardly against the pair of spacers and the vessel assembly sandwiched therebetween.

15. The system of claim 1, wherein the cryostorage bag further comprises an access channel extending outwardly from the interior region and in fluid communication thereto.

16. The system of claim 15, wherein the access channel comprises a length that extends outwardly beyond the outer perimeter of the pair of cushion elements when the vessel assembly is assembled.

17. A method for shaping a liquid material within a cryostorage bag while undergoing a freezing procedure, said method comprising steps for:
   positioning a cryostorage bag between a pair of cushion elements;
   positioning the cryostorage bag and the pair of cushion elements between a pair of frame elements;
   securing the cryostorage bag, the pair of cushion elements, and the pair of frame elements together to provide a vessel assembly;
   accessing and filling an interior region of the cryostorage bag of the vessel assembly with a liquid material;
   sealing the liquid material within the interior region of the cryostorage bag of the vessel assembly;
   trimming an excess portion of the cryostorage bag;
   fitting spacers within a window of the pair of frame elements and in contact with the cryostorage bag;
   restricting the liquid material to a region of the cryostorage bag as defined by the pair of cushion elements, the pair of frame elements, and the spacers;
   sandwiching the vessel assembly and the spacers within the window of the pair of frame elements between two opposing thermally conductive plates; and
   freezing the liquid material to provide a solid shape, wherein the solid shape is defined by pair of cushion elements, the pair of frame elements, the spacers, and the thermally conductive plates.

18. The method of claim 17, further comprising a step for applying a clamping pressure to an outer surface of the thermally conductive plates such that a compressive force is exerted on the vessel assembly, the spacers, the cryostorage bag, and the restricted liquid material within the region of the cryostorage bag during a freezing procedure.

19. The method of claim 17, wherein the solid shape comprises two opposing major planar and parallel surfaces.

20. The method of claim 17, further comprising a step for securing the cryostorage bag, the pair of cushion elements, and the pair of frame elements together with a fastener prior to the step of accessing and filling the interior region of the cryostorage bag.

* * * * *